(12) United States Patent
Lynn et al.

(10) Patent No.: US 8,548,978 B2
(45) Date of Patent: *Oct. 1, 2013

(54) NETWORK VIDEO GUIDE AND SPIDERING

(75) Inventors: Owen Lynn, Mountain View, CA (US); Richard Humphrey, San Mateo, CA (US); Dale Thoms, San Mateo, CA (US)

(73) Assignee: Virage, Inc., San Francisco, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/842,740

(22) Filed: Aug. 21, 2007

(65) Prior Publication Data

US 2007/0282819 A1    Dec. 6, 2007

Related U.S. Application Data

(63) Continuation of application No. 09/828,506, filed on Apr. 6, 2001, now Pat. No. 7,260,564.

(60) Provisional application No. 60/195,745, filed on Apr. 7, 2000, provisional application No. 60/195,746, filed on Apr. 7, 2000.

(51) Int. Cl.
*G06F 17/30* (2006.01)
*G06F 7/00* (2006.01)
*G06F 17/00* (2006.01)

(52) U.S. Cl.
USPC ............................ 707/710; 707/741; 707/914

(58) Field of Classification Search
USPC ............................................... 707/710
See application file for complete search history.

(56) References Cited

U.S. PATENT DOCUMENTS

| | | |
|---|---|---|
| 4,115,805 A | 9/1978 | Morton |
| 4,334,241 A | 6/1982 | Kashioka et al. |
| 4,574,319 A | 3/1986 | Konishi |
| 5,027,400 A | 6/1991 | Baji et al. |
| 5,045,940 A | 9/1991 | Peters et al. |
| 5,136,655 A | 8/1992 | Bronson |
| 5,307,456 A | 4/1994 | MacKay |

(Continued)

FOREIGN PATENT DOCUMENTS

| | | |
|---|---|---|
| EP | 545727 A2 | 6/1993 |
| WO | WO 92 22983 | 12/1992 |
| WO | WO 96 12239 | 4/1996 |
| WO | WO 97 26758 | 7/1997 |

OTHER PUBLICATIONS

"Streaming Email", XP-002150023; Sep. 4, 1998; pp. 303-317.

(Continued)

*Primary Examiner* — Kannan Shanmugasundaram

(57) ABSTRACT

A system and method that provides a hosted network video guide application. The guide application is provided as a service to web portals and other websites that wish to expose access to the video content available on a public network such as the Internet. The operation of the guide includes mechanisms for search application hosting and processes for content gathering. Video index information can be derived from random content owners, guide affiliates, proactively gathered public domain content, and proactively harvested video content from the network via a video spidering mechanism. The video index information can be collected and maintained in a hosted, centralized repository and made available via an application interface, which can be customized, to users of the network. The video spidering mechanism generates an index of each accessed video, and the index is committed to the guide repository along with the URL information of the video being indexed.

15 Claims, 12 Drawing Sheets

(56) References Cited

U.S. PATENT DOCUMENTS

| | | |
|---|---|---|
| 5,335,072 A | 8/1994 | Tanaka et al. |
| 5,414,808 A | 5/1995 | Williams et al. |
| 5,446,919 A | 8/1995 | Wilkins |
| 5,467,288 A | 11/1995 | Fasciano et al. |
| 5,481,296 A | 1/1996 | Cragun et al. |
| 5,485,553 A | 1/1996 | Kovalick et al. |
| 5,485,611 A | 1/1996 | Astle |
| 5,506,644 A | 4/1996 | Suzuki et al. |
| 5,508,940 A | 4/1996 | Rossmere et al. |
| 5,521,841 A | 5/1996 | Arman et al. |
| 5,535,063 A | 7/1996 | Lamming |
| 5,551,016 A | 8/1996 | Loeb et al. |
| 5,557,320 A | 9/1996 | Krebs et al. |
| 5,561,457 A | 10/1996 | Cragun et al. |
| 5,566,290 A | 10/1996 | Silverbrook |
| 5,568,328 A | 10/1996 | Takahashi et al. |
| 5,574,845 A | 11/1996 | Benson et al. |
| 5,606,655 A | 2/1997 | Arman et al. |
| 5,613,032 A | 3/1997 | Cruz et al. |
| 5,633,678 A | 5/1997 | Parulski et al. |
| 5,642,285 A | 6/1997 | Woo et al. |
| 5,649,060 A | 7/1997 | Ellozy et al. |
| 5,655,117 A | 8/1997 | Goldberg et al. |
| 5,657,077 A | 8/1997 | DeAngelis et al. |
| 5,664,218 A | 9/1997 | Kim et al. |
| 5,664,227 A | 9/1997 | Mauldin et al. |
| 5,677,994 A | 10/1997 | Miyamori et al. |
| 5,680,639 A | 10/1997 | Milne et al. |
| 5,682,458 A | 10/1997 | Funazaki |
| 5,692,104 A | 11/1997 | Chow et al. |
| 5,701,153 A | 12/1997 | Reichek et al. |
| 5,706,290 A | 1/1998 | Shaw et al. |
| 5,706,457 A | 1/1998 | Dwyer et al. |
| 5,732,219 A * | 3/1998 | Blumer et al. ............... 709/227 |
| 5,740,388 A | 4/1998 | Hunt |
| 5,745,637 A | 4/1998 | Phillips et al. |
| 5,751,280 A | 5/1998 | Abbott et al. |
| 5,767,893 A | 6/1998 | Chen |
| 5,774,170 A | 6/1998 | Hite et al. |
| 5,774,664 A | 6/1998 | Hidary et al. |
| 5,777,612 A | 7/1998 | Kataoka |
| 5,778,181 A | 7/1998 | Hidary et al. |
| 5,794,249 A | 8/1998 | Orsolini et al. |
| 5,796,428 A | 8/1998 | Matsumoto et al. |
| 5,809,512 A | 9/1998 | Kato |
| 5,813,014 A | 9/1998 | Gustman |
| 5,815,201 A | 9/1998 | Hashimoto et al. |
| 5,818,512 A | 10/1998 | Fuller |
| 5,822,024 A | 10/1998 | Setogawa et al. |
| 5,822,537 A | 10/1998 | Katseff et al. |
| 5,826,102 A | 10/1998 | Escobar et al. |
| 5,828,809 A | 10/1998 | Chang et al. |
| 5,835,667 A | 11/1998 | Wactlar et al. |
| 5,838,314 A | 11/1998 | Neel et al. |
| 5,852,435 A | 12/1998 | Vigneaux et al. |
| 5,861,881 A | 1/1999 | Freeman et al. |
| 5,864,823 A | 1/1999 | Levitan |
| 5,870,754 A | 2/1999 | Dimitrova et al. |
| 5,872,565 A | 2/1999 | Greaves et al. |
| 5,872,865 A | 2/1999 | Normile et al. |
| 5,875,446 A | 2/1999 | Brown et al. |
| 5,884,056 A | 3/1999 | Steele |
| 5,889,578 A | 3/1999 | Jamzadeh |
| 5,890,175 A | 3/1999 | Wong et al. |
| 5,893,095 A | 4/1999 | Jain et al. |
| 5,898,441 A | 4/1999 | Flurry |
| 5,903,261 A | 5/1999 | Walsh et al. |
| 5,903,892 A | 5/1999 | Hoffert et al. |
| 5,911,139 A | 6/1999 | Jain et al. |
| 5,913,205 A | 6/1999 | Jain et al. |
| 5,915,250 A | 6/1999 | Jain et al. |
| 5,917,958 A | 6/1999 | Nunally |
| 5,918,012 A | 6/1999 | Astiz et al. |
| 5,920,856 A | 7/1999 | Syeda-Mahmood |
| 5,926,205 A | 7/1999 | Krause et al. |
| 5,930,446 A | 7/1999 | Kanda |
| 5,930,493 A | 7/1999 | Ottesen et al. |
| 5,946,445 A | 8/1999 | Peters et al. |
| 5,953,005 A | 9/1999 | Liu |
| 5,963,702 A | 10/1999 | Yamashita |
| 5,969,716 A | 10/1999 | Davis et al. |
| 5,969,772 A | 10/1999 | Saeki |
| 5,974,572 A * | 10/1999 | Weinberg et al. ...... 707/E17.116 |
| 5,977,964 A | 11/1999 | Williams et al. |
| 5,982,979 A | 11/1999 | Omata et al. |
| 5,983,176 A | 11/1999 | Hoffert et al. |
| 5,983,237 A | 11/1999 | Jain et al. |
| 5,987,454 A | 11/1999 | Hobbs |
| 5,987,509 A | 11/1999 | Portuesi |
| 5,990,955 A | 11/1999 | Koz |
| 6,006,241 A | 12/1999 | Purnaveja et al. |
| 6,006,257 A | 12/1999 | Slezak |
| 6,006,265 A | 12/1999 | Rangan et al. |
| 6,009,410 A | 12/1999 | LeMole et al. |
| 6,009,507 A | 12/1999 | Brooks et al. |
| 6,014,183 A | 1/2000 | Hoang |
| 6,014,693 A | 1/2000 | Ito et al. |
| 6,018,768 A | 1/2000 | Ullman et al. |
| 6,034,942 A | 3/2000 | Yoshio et al. |
| 6,061,056 A | 5/2000 | Menard et al. |
| 6,065,050 A | 5/2000 | DeMoney |
| 6,084,595 A | 7/2000 | Bach et al. |
| 6,094,671 A | 7/2000 | Chase et al. |
| 6,112,226 A | 8/2000 | Weaver et al. |
| 6,115,717 A | 9/2000 | Mehrotra et al. |
| 6,119,123 A | 9/2000 | Elenbaas et al. |
| 6,119,154 A | 9/2000 | Weaver et al. |
| 6,134,243 A | 10/2000 | Jones et al. |
| 6,154,771 A | 11/2000 | Rangan et al. |
| 6,167,404 A | 12/2000 | Morcos et al. |
| 6,167,427 A * | 12/2000 | Rabinovich et al. ........ 709/201 |
| 6,169,573 B1 | 1/2001 | Sampath-Kumar et al. |
| 6,170,065 B1 * | 1/2001 | Kobata et al. ................. 714/7 |
| 6,173,287 B1 | 1/2001 | Eberman et al. |
| 6,175,862 B1 * | 1/2001 | Chen et al. ................... 709/218 |
| 6,185,527 B1 | 2/2001 | Petkovic et al. |
| 6,205,260 B1 | 3/2001 | Crinon et al. |
| 6,211,869 B1 | 4/2001 | Loveman et al. |
| 6,233,389 B1 | 5/2001 | Barton et al. |
| 6,236,395 B1 | 5/2001 | Sezan et al. |
| 6,240,553 B1 | 5/2001 | Son et al. |
| 6,259,828 B1 | 7/2001 | Crinon et al. |
| 6,285,788 B1 | 9/2001 | Sezan et al. |
| 6,289,346 B1 | 9/2001 | Milewski et al. |
| 6,295,092 B1 | 9/2001 | Hullinger et al. |
| 6,317,885 B1 | 11/2001 | Fries |
| 6,324,338 B1 | 11/2001 | Wood et al. |
| 6,356,658 B1 | 3/2002 | Sezan et al. |
| 6,360,234 B2 | 3/2002 | Jain et al. |
| 6,363,380 B1 | 3/2002 | Dimitrova |
| 6,370,543 B2 | 4/2002 | Hoffert et al. |
| 6,389,473 B1 | 5/2002 | Carmel et al. |
| 6,415,099 B1 | 7/2002 | Berger |
| 6,457,010 B1 | 9/2002 | Eldering et al. |
| 6,462,754 B1 | 10/2002 | Chakraborty et al. |
| 6,462,778 B1 | 10/2002 | Abram et al. |
| 6,463,444 B1 | 10/2002 | Jain et al. |
| 6,470,337 B1 | 10/2002 | Nihei |
| 6,473,804 B1 | 10/2002 | Kaiser et al. |
| 6,480,853 B1 | 11/2002 | Jain |
| 6,484,148 B1 | 11/2002 | Boyd |
| 6,498,897 B1 | 12/2002 | Nelson et al. |
| 6,505,160 B1 | 1/2003 | Levy et al. |
| 6,526,215 B2 | 2/2003 | Hirai et al. |
| 6,546,185 B1 | 4/2003 | Kim et al. |
| 6,567,980 B1 | 5/2003 | Jain et al. |
| 6,571,054 B1 | 5/2003 | Tonomura et al. |
| 6,591,247 B2 | 7/2003 | Stern |
| 6,606,117 B1 | 8/2003 | Windle |
| 6,640,145 B2 | 10/2003 | Hoffberg et al. |
| 6,654,030 B1 | 11/2003 | Hui |
| 6,675,174 B1 | 1/2004 | Bolle et al. |
| 6,686,970 B1 | 2/2004 | Windle |
| 6,698,020 B1 | 2/2004 | Zigmond et al. |

| | | | |
|---|---|---|---|
| 6,738,100 B2 | 5/2004 | Hampapur et al. | |
| 6,760,749 B1 | 7/2004 | Dunlap et al. | |
| 6,774,926 B1 | 8/2004 | Ellis et al. | |
| 6,795,863 B1 | 9/2004 | Doty | |
| 6,801,576 B1 | 10/2004 | Haldeman et al. | |
| 6,813,384 B1 | 11/2004 | Acharya et al. | |
| 6,833,865 B1 | 12/2004 | Fuller et al. | |
| 6,834,083 B1 | 12/2004 | Tahara et al. | |
| 6,877,134 B1 | 4/2005 | Fuller et al. | |
| 6,886,178 B1 | 4/2005 | Mao et al. | |
| 7,017,173 B1 | 3/2006 | Armstrong et al. | |
| 7,028,071 B1 | 4/2006 | Silk et al. | |
| 7,093,191 B1 | 8/2006 | Jain et al. | |
| 7,209,942 B1 | 4/2007 | Hori et al. | |
| 7,222,163 B1 | 5/2007 | Girouard et al. | |
| 7,260,564 B1 | 8/2007 | Lynn et al. | |
| 7,295,752 B1 | 11/2007 | Jain et al. | |
| 7,403,224 B2 | 7/2008 | Fuller et al. | |
| 7,424,677 B2 | 9/2008 | Sezan et al. | |
| 7,769,827 B2 | 8/2010 | Girouard et al. | |
| 7,962,948 B1 | 6/2011 | Girouard et al. | |
| 8,107,015 B1 | 1/2012 | Hampapur et al. | |
| 8,171,509 B1 | 5/2012 | Girouard et al. | |
| 8,387,087 B2 | 2/2013 | Girouard et al. | |
| 2001/0012062 A1 | 8/2001 | Anderson | |
| 2001/0014891 A1* | 8/2001 | Hoffert et al. | 707/104.1 |
| 2001/0018693 A1* | 8/2001 | Jain et al. | 707/500 |
| 2002/0054752 A1 | 5/2002 | Wood et al. | |
| 2002/0056123 A1 | 5/2002 | Liwerant et al. | |
| 2002/0191087 A1 | 12/2002 | Hashimoto et al. | |
| 2002/0199194 A1 | 12/2002 | Ali | |
| 2003/0078766 A1 | 4/2003 | Appelt et al. | |
| 2003/0195877 A1 | 10/2003 | Ford et al. | |
| 2005/0033760 A1 | 2/2005 | Fuller et al. | |
| 2005/0198006 A1 | 9/2005 | Boicey et al. | |
| 2005/0198677 A1 | 9/2005 | Lewis | |
| 2005/0234985 A1 | 10/2005 | Gordon et al. | |
| 2007/0282818 A1 | 12/2007 | Lynn et al. | |
| 2007/0282819 A1 | 12/2007 | Lynn et al. | |
| 2008/0028047 A1 | 1/2008 | Girouard et al. | |
| 2008/0131072 A1 | 6/2008 | Chang et al. | |
| 2009/0052735 A1 | 2/2009 | Rhoads | |
| 2011/0214144 A1 | 9/2011 | Girouard et al. | |
| 2012/0128242 A1 | 5/2012 | Hampapur et al. | |
| 2012/0215629 A1 | 8/2012 | Girouard et al. | |

OTHER PUBLICATIONS

Johnston et al., "Real-time Digital libraries based on Widely Distributed, High Performance Management of Large-Data-Objects": International Journal of Digital Libraraies, vol. 1, No. 3, Dec. 1997.
Office Action for U.S. Appl. No. 10/872,191 dated Mar. 27, 2008.
"How Flashpix Works", 1996, printed from http://www.digitalimaging.org/flashpix howitworks.html on Oct. 6, 1998 (2 pages).
"How to make computer-ready FlashPix images", 1996, printed from http://www.flashpix.com/howtofpx/howtofpx.html on Oct. 6, 1998 (1 page).
"MPEG-7 Context and Objectives," International Organisation for Standardisation, printed from http://drogo.cselt.stet.it/mpeg/standards/mpeg-7/mpeg-7.htm on Oct. 6, 1998 (9 pages).
"MPEG-7 Frequently Asked Questions", International Organization for Standardization, printed from httn://drogo.cselt.stet.it/mpeg/faq/faq_mpeg-7.htm on Oct. 6, 1998 (3 pages).
"NEC develops world's first professional quality digital optical disk camera", printed from http://info.nec.co.in/english/today/newsrel/9611/0701.html on Nov. 30, 1998 (2 pages).
"Overview of the MPEG-4 Standard", International Organization for Standardization, printed from htto://drogo.cselt.stet.it/mpeg/standards/mpeg-4/mpeg-4.htm on Oct. 6, 1998 (42 pages).
Frequently Asked Questions on MPEG-4 Video: International Organization for Standardization, printed from htto:/dgrogo.cselt.stet.it./mpeg/faq/faq-video.htm on Oct. 6, 1998 (7 pages).
8×8, Inc.—Chip Solutions, "Semiconductors: VCP Single Chip Video Codec and Multimedia Communications Processor," printed from http://www.8×8.com/oemchips/vcp.html on Jun. 15, 1999 (1 page).
Arman, F., Depommier, R., Hsu, Arding and Chiu, Ming-Yee, ACM Multimedia, pp. 97-103 (1994), "Content-Based Browsing of Video Sequences".
Arman, Farshid, Hsu, Arding and Chiu, Ming-Yee, SPIE vol. 1908, pp. 2-12, (1993), "Feature Management for Large Video Databases".
Avid Answers, Avid Technology, Inc., vol. 2, No. 6, Nov./Dec. 1995.
Avid Answers, Avid Technology, Inc., vol. 3, No. 1, Jan./Feb. 1996.
Babaguchi et al., Event based indexing of broad casted sports video by Intermodal Collaboration, IEEE Transactions on Multimedia, V.4, Issue 1, Mar. 2002, pp. 68-75.
Broadcast Update, Avid Technology, Inc., vol. 1, No. 1, Oct. 1996.
Chen, et al., "Metadata for Mixed-Media Access", SIGMOD Record, vol. 23, No. 4, Dec. 1994, 8 pages.
Editors: Non-Linear: ES7, printed from http://bpgprod.sel.sony.com/modelfeatures.bpg?cat=Editors&subcat=Non-Linear(ci)model+ES7 on Dec. 17, 1998 (2 pages).
Evans, "Computerized Analysis of Television Content: Advanced Imaging for the Social Sciences," (Nov. 1999), Advanced Imaging, p. 17-18.
Excalibur Technologies, (1998). Vienna Virginia (Brochure), "Excalibur Screening Room TM: The Intelligent Way to Reveal and Leverage Video Content".
Film and Television Update, Avid Technology, Inc., vol. 1, No. 1, Jul. 1997.
Glavitsch, et al., "Metadata for Integrating Speech Documents in a Test Retrieval System", SIGMOD Record, vol. 23, No. 4, Dec. 1994, 7 pgs.
Hampapur, Arun, Gupta, Amarnath, Horowitz, Bradley, Shu, Chiao-Fe, et al., Virage Inc., Mar. 1997, San Mateo, California, "Virage Video Engine".
Hjelsvold, et al., Web-based personalization and management of interactive video, International World Wide Web Conference, Year 2001, pp. 129-139.
Islip Media, MediaKey Digital Video Library System Demonstration, NAB (1998) (Information Sheet) "Unlocking the Value of Video".
Java Script XML Parser, http://www.stylusstudio.com/xmldev/199712/post70460.html, pp. 1-2, Dec. 31, 1997.
Kashyap et al., "Metadata for building the multimedia patch quilt", Multimedia Database Systems: Issues and Research Directions. 1995-Isdis.cs.uga.edu.
Little et al., A Digital On-Demand Video Service Supporting Content-Based Queries, 8/(1-6)/93/36.
Luther, Arch C., "Video Camera Technology", 1998, Figure 4.1.1 Signal Processing Block Diagram (3 pages total).
MultiMedia Access Corporation—Osprey-1000, printed from http://www.viewcast.com/osprey1000.html on Jun. 11, 1999 (6 pages).
Page from Akamai Web Site, "How EdgeScape Works," http://www.akamai.com/html/en/sv/edgescape_works.html, printed Mar. 27, 2001.
Page from Innovatv.com Web Site, "iMag," http://www.innovatv.com/iMag.htm, printed Mar. 20, 2000.
Page from Innovatv.com Web Site, "myiMag.com," http://www.myimag.com/afterlogin4.asp, printed Mar. 20, 2000.
Page from Innovatv.com Web Site, "Seeing is believing," http://www.innovalv.com/news_011000_em.htm, Jan. 10, 2000.
Page from Innovatv.com Web Site, "Tools & Technology," http://www.innovatv.com/tools.htm, printed Mar. 20, 2000.
Page from MediaSite Web Site "Branded MediaSites," http://www.mediasite.net/info/ps_branded.htm, printed Jul. 28, 2000.
Page from MediaSite Web Site, "First Searchable Video Website Solution Adds New Content Providers," http://www.mediasite.net/info/prcontent.htm, Jun. 24, 1999.
Page from MediaSite Web Site, "MediaSite Publisher Modules," http://www.mediasite.net/info/ps_mkbul.htm, printed Jul. 28, 2000.
Page from MediaSite Web Site, "MediaSite Web Finder 4.0," http://www.mediasite.net/info/ps_mkfin.htm, printed Jul. 28, 2000.
Page from The Search Engine Watch Web Site, "SpiderSpotting Chart," http://www.searchenginewatch.com/webmasters/spiderchart.html, printed Mar. 30, 2001.
Page from Virage Web Site, "MyLogger," www.virage.com/products/mylogger.html, printed Jan. 6, 2000.

Page from Virage Web Site, "Press Releases," www.virage.com/news/dec_1999_mylogger-launch.html, Dec. 7, 1999.
Page from Virage Web Site, "Video Search Tools," www.virage.com/products/vst.html, printed Jan. 6, 2000.
Page from Virage Web Site, "Virage Interactive," http://www.virage.com/products/vst.html, printed Jan. 6, 2000.
PR Newswire Association, Inc., "Duquesne University to Offer First Searchable Video Classes Over the Web; Partners With ISLIP Media to Build Advanced Internet Video Classes," Dec. 15, 1998.
Rapoza, Spider spins power searches, *PC Week*, May 10, 1999.
Rigby, Martin, "What is FlashPix?" 1996, printed from http://www.fiashpix.comIWhatIsfpx.html on Oct. 6, 1998 (1 page).
Rowley, Henry A., Baluja, Shumeet and Kanade, Takeo, CMU-CS-95-158R, Nov. 1995, Pittsburgh, Pennsylvania, "Human Face Detection in Visual Scenes".
Sherman, Howard, Howard Sherman Public Relations News, Apr. 9, 1998 (News Release), "Ingenious Realtime Video Archival & Retrieval Solution".
Smith, Aguirre T., Davenport, G., ACM Workshop on Networking and Operating System Support for Digital Audio and Video (1992), San Diego, California, pp. 250-261, "The Stratification System: A Design Environment for Random Access Video".
Smith, Aguirre T., MIT MS Thesis (1992), "If You Could See What I Mean . . . ".
Smith, Aguirre T., Multimedia—For Now & the Future, Summer Proceedings, USENIX Technical Conference and Exhibition (1991), DD. 157-168, "Parsing Movies in Context".
Smith, Michael A. and Kanade, Takeo, CMU-CS-95-186, Jul. 30, 1995, Pittsburgh, Pennsylvania, "Video Skimming for Quick Browsing Based on Audio and Image Characterization".
The Content Group, Content Watch, vol. 1 No. 5. pp. 20-22, (1998), "Islip Media Delivers Advanced Tools for Video Indexing and Retrieval".
The Content Group, Content Watch, vol. 1 No. 5. pp. 6-7, 23, (1998), "Excalibur Enters the Video Market With the Release of Excalibur Screening Room".
The IEEE Standard Dictionary of Electrical and Electronics Terms, IEEE STD 100-1996, Published by Institute of Electrical and Electronics Engineers, Inc., Sixth Edition, p. 648.
Videotape and Disk Recorders: DVCAM: DSR1, printed from http://bpgprod.sel.sony.com/modelfeatures.bpg?cat+Videotape+and+Disk+Record . . . On Dec. 17, 1998 (2 pages).
Virage, Inc. "The Virage Video Cataloger 1.3," 1998, San Mateo, CA (brochure).
Virage, Inc. "Virage Releases VideoLogger 2.0 at Streaming Media '98 Conference," 1998, San Mateo, CA (news release).
Virage, Inc. Brochure, "MyLogger™," Copyright 1999.
Virage, Inc. Brochure, "Video Search Tools," Copyright 1999.
Virage, Inc. Brochure, "Virage Interactive™," Copyright 1999.
Virage, Inc., "The Virage Media Management System", (1997), San Mateo, California (Brochure).
Virage, Inc., "Virage Video Cataloger & Video Browser," 1997, San Mateo, CA (brochure).
Virage, Inc., The Virage Media Manager & Browser 1.1, (1998), San Mateo, California (Brochure), "Place Your Media Assets Within Reach of Your Entire Enterprise".
Virage, Inc., The Virage Video Cataloger 1.1, (1998), San Mateo, California (Brochure), "Discover a Highly Efficient Approach to Video Cataloging".
Visionary, Media Access Technologies, Ltd., (1998) (Brochure) Automated Logging and Search Solution for Multimedia Streams and Libraries.
Zhang, et al., A Natural language approach to content-based video indexing and retrieval for interactive E-learning, IEEE Transactions on Multimedia. V.6, Issue 3, Jun. 2004, pp. 450-458.
Zhou, et al., A web-enabled video indexing system, International Multimedia Conference, Year 2004, pp. 307-314.
Chang, et al., "Efficient Video Indexing Scheme for Content-Based Retrieval," *IEEE Trans on Circ and Sys for Vid Tech*, vol. 9, No. 8, Dec. 1999, pp. 1269-1279.
Ferman, et al., "Multiscale Content Extraction and Representation for Video Indexing," *SPIE*, vol. 3229, pp. 23-31, 1997.
Smith, John R., et al., "Digital Video Libraries and the Internet," IEEE Comms Mag (1999) pp. 92-97.

* cited by examiner

NETWORK VIDEO GUIDE AND SPIDERING

RELATED APPLICATIONS

This application is a continuation of U.S. patent application Ser. No. 09/828,506, filed Apr. 6, 2001 (now issued as U.S. Pat. No. 7,260,564), which claims the benefit of (1) U.S. Provisional Application No. 60/195,745, filed Apr. 7, 2000 and titled "Networked Video Search Engine Directory," and (2) U.S. Provisional Application No. 60/195,746, filed Apr. 7, 2000 and titled "Network Video Spider." Each of the above-referenced applications is hereby incorporated by reference. This application is related to U.S. application Ser. No. 09/827,772 (now U.S. Pat. No. 7,222,163), filed Apr. 7, 2001, U.S. application Ser. No. 09/828,618, filed Apr. 7, 2001 and titled "Video-Enabled Community Building," and to U.S. application Ser. No. 09/828,507, filed Apr. 7, 2001 and titled "Video-Enabled E-Commerce," which are all hereby incorporated by reference.

BACKGROUND OF THE INVENTION

1. Field of the Invention

The present invention generally relates to the field of accessing and processing digital video on a network such as the Internet. More particularly, the invention relates to innovative techniques to solve the problem of finding video content on the Internet.

2. Description of the Related Technology

A number of techniques have evolved in recent years as the Internet has grown in size and sophistication, including:

The use of web servers and HTML delivery to web browsers.

The use of the application-server model for connecting database information with web pages and interactive interfaces for end users.

The use of dynamically generated HTML that pulls information from a database to dynamically format HTML for delivery to the end user.

The use of a template language to merge database output with pre-formatted HTML presentations.

The use of 'cookies' to track individual user preferences as they interact with the web pages and applications.

These and other related web technologies and techniques are in commonplace use and readily accessible on the Internet.

In addition to the technologies described above, video indexing technology has also emerged, herein referred to as 'video logging'. Video logging is a process that incorporates both automated indexing and manual annotation facilities to create a rich, fine-grained (in a temporal sense) index into a body of video content. The index typically consists of a combination of visual and textual indices that permit time-based searching of video content. The index may incorporate spoken text, speaker identifications, facial identifications, on-screen text, and additional annotations, keywords, and descriptions that may be applied by a human user executing the video logging application. The Virage VideoLogger® is one example of this type of video logging technology that is commercially available.

The delivery of coded media on the Internet requires the encoding of video content into one or more coding video formats and efficient delivery of that content to the end users. Common coding formats presently in use include RealVideo, Microsoft Windows Media, QuickTime, and MPEG. The video logging technology may help to orchestrate the encoding of one or more of these formats while the video is being indexed to ensure that the video index is time-synchronized with the encoded content. The final delivery of coded media content to an end user is typically accomplished with a wide variety of video serving mechanisms and infrastructure. These mechanisms may include basic video servers (such as those from Real, Microsoft, and Apple), caching appliances (such as those from CacheFlow, Network Appliance, Inktomi, and Cisco), and content delivery networks (herein "CDN's", such as those from Akamai, Digital Island, iBeam, and Adero). These types of video serving mechanisms deliver media content to the end user.

Coded media such as video, Flash™, SMIL, and similar formats (collectively referred to as 'video') is available on the World Wide Web in large quantities. Video content is available 'on demand' from archives, and is 'webcast' in a live manner similar to broadcasts. While there some efforts to provide a "TV Guide" for the live webcasted video (such as Yack and ChannelSeek), there are unfortunately very few indexes of archived video content. The only ones that exist are highly localized (they only index one site). End users have no central search and access mechanism like those that exist for web-based text content using traditional search engines. Moreover, the content is rapidly changing and growing, and this makes it impossible for individuals remain abreast of the content available at any given time.

What would be desired is the ability to automatically discover and index video content existing on web pages. This discovery and indexing process is called 'web crawling' or 'spidering'. The fundamental concept of spidering is to traverse a set of hyperlinked documents (web pages) by following the hyperlinks from one page to the next. Existing spidering technologies are intended to generate an index of the text content found on the pages by parsing the HTML. However, web pages contain many more forms of content other than text. They also contain rich media such as images, video, and animated graphics (i.e., SMIL, Flash or Shockwave presentations). These types of content are embedded in HTML statements or sophisticated blocks of scripting language (such as JavaScript or VBscript). Existing spiders identify these types of content and skip over them. It would be advantageous to locate and identify rich content in order to index it.

Identifying a video URL for indexing may be fairly easy in some cases if the video content is a simple file linked in a basic HTML "HREF" statement. However, most video content is exposed on web pages in a more complex manner using scripting languages and meta-container files (like ".asx" and ".ram") to make the presentation of the video interactive, to specify a play-list of individual videos, or to offer multiple choices of bit-rates or formats. Thus, the URL for the content is not explicit, but must be evaluated by executing the scripting language or parsing the container file in a similar way as would a web browser application. Even then, it is necessary to identify the multiple versions of a piece of content so that it is only indexed one time. Thus, it would be desirable to parse out blocks of script and execute it, and also to use the context of the script, video URLs, and surrounding HTML to group versions (varying by bit-rate and/or coding format) of the same content together.

SUMMARY OF CERTAIN INVENTIVE ASPECTS

The present system and method solves the problem of 'how an individual finds video content' by creating a centralized index repository, constantly updated, that can be used by individuals to perform searches. The search index is a hosted web application called the Internet video guide (IVG) that can be integrated into other websites in a variety of ways and also solves a significant interface problem. Since there is (probably) no "one right way" to present the spectrum of web video content in a search interface, the IVG is designed to be used by existing web search sites (websites like Yahoo, Excite, Earthlink, Altavista, etc, called 'portals') to expose various custom-tailored interfaces to the end user. It could be a category-browser interface as in Yahoo, or a keyword-search interface as in Altavista, or a combination of both. Also, small websites with a narrow interest in a particular content area can only expose links or search interfaces that exploit a small part of the index. As a hosted web application, it gains the efficiencies of a single repository, but the interface flexibility of multiple websites.

Aspects of the system and method locate and identify rich content in order to index it. The spider is designed to operate on video or animation (hereafter 'video') content in the form of coded video or files, and uses video logging technology to generate an index of the video. The index is committed to the IVG repository along with a location identifier, such as an Uniform Resource Locator (URL), of the video being indexed.

The URL for the content is not explicit, but is evaluated by executing the scripting language or parsing the container file in a similar way as would a web browser application. Even then, it is necessary to identify the multiple versions of a piece of content so that it is only indexed one time. The present system and method can parse out blocks of script and execute it, and also to use the context of the script, video URLs, and surrounding HTML to group versions (varying by bit-rate and/or coding format) of the same content together.

A by-product of parsing scripts and dynamic URL construction is that the video URL contains not only access to the video content itself but often also contains the mechanism to launch the video for playback in the player window of the site containing the video. Player windows are typically highly customized and branded for the site, and typically contain navigation elements, branding elements (like logos), and advertising elements. When the video index repository is searched for video content, the corresponding URL of the video can be used to invoke the specific player window of the website containing the video. This capability is far more compelling and informative to the user in comparison to just accessing raw video out of context. This capability also importantly avoids any rights management issues that arise due to 'deep linking', i.e., directly accessing the content and hiding its origin.

The result of the spidering process is a collection of video URLs that are passed (through a queue) to a video logging process. Each URL is accessed, and the video content is downloaded or transmitted to the video logging process for indexing. The index data is then committed to the main repository of the Internet Video Guide search application.

The present system and method includes a set of 'maintenance' features that the spider employs as it is spidering. The maintenance features are similar to existing text-locating spiders currently deployed by popular web search sites, and are intended to minimize re-indexing of content. The World Wide Web is a dynamic place, and content on web pages is changing frequently. But not all of it is changing. The spider uses date information to see if a URL needs updating, and it looks for new URLs on pages it has previously indexed. It also keeps track of missing URLs (content that was removed), and performs integrity checking so as to insure the URL links to a video that still exists.

The present system and method utilizes techniques where an index of video content dispersed across the World Wide Web is generated and stored in a central repository called the Internet video guide (IVG). In one embodiment, the IVG is a hosted web-based application incorporating innovative mechanisms for collecting the index of video content. The system is discussed in two parts: the IVG application itself and an innovative video spidering mechanism that enables the collection and indexing of video content on the Web which makes the IVG possible and useful.

The IVG (also hereinafter referred to as the "Guide") is a hosted application that is provided as a service to web portals and other websites that wish to expose access to the broad array of video content available on the Internet, either as a whole, or as selected subsets (such as medical content, or science content, etc.). The operation of the Guide is the conjunction of the mechanism for search application hosting and the processes of content gathering.

The video spidering mechanism of the Guide is an important innovation that allows the viable realization of the Guide. Just as text-based Internet spiders enabled the existence of traditional web-search services and engines, the video spider enables the existence of the IVG. The video spidering technology is similar to existing spiders for crawling text-based web pages (i.e., HTML documents), but includes novel new aspects. The spider operates on video content in the form of coded video or files, and uses video logging technology to generate an index of the video, incorporating both automated processing and an option for manual, editorial processes. The index is committed to the Guide repository along with the URL information of the video being indexed.

In one aspect of the present invention, there is a system of indexing and searching video, comprising a video index generated through a logging mechanism that associates the video index with a location identifier of the video, a search engine operating on the index, a web server and application logic to perform searches against the index and deliver search results to browsers, and a template mechanism configured to inject the video into templates at a search site. The system may further comprise a spidering module configured to automatically locate and index video content on a network. The video index may be additionally generated by human annotation.

In another aspect of the present invention, there is a method of video directory formation, comprising capturing an aggregation of index data from existing sources having previously indexed videos, and capturing and indexing videos transmitted using a video distribution mechanism. The video distribution mechanism may include satellite, cable, and airwaves.

In another aspect of the present invention, there is a method of video directory formation, comprising using a spidering process to gather and maintain video content located on a network, and capturing and indexing videos transmitted using a video distribution mechanism. The video distribution mechanism may include satellite, cable, and airwaves.

In another aspect of the present invention, there is a method of video directory formation, comprising using a spidering process to gather and maintain video content located on a network, and capturing an aggregation of index data from existing sources having previously indexed videos.

In another aspect of the present invention, there is a system for sharing indexed video, comprising a spider module configured to gather video content from a network, and a hosting service in data communication with the spider module, wherein the hosting service is configured to share searchable video for customized viewing at customer sites. The system may further comprise at least one website configured to integrate the video shared by the hosting service into the website using at least one search and retrieval metaphor, where the website may comprise a web portal. The system may further comprise a search web page having a search form that includes one or more fields used to express a query. The hosting service may include a logging facility configured to generate an index of the gathered video content, and may further comprise a browse web page having category links arranged in a subject hierarchy, with leaf nodes of the hierarchy performing pre-defined searches against the index.

In another aspect of the present invention, there is a method of video spidering, comprising traversing a set of hyperlinked documents by following the hyperlinks from one page to the next so as to identify digital video, generating a time-based index of the video, and storing the index in a repository along with a hyperlinked location identifier associated with the video being indexed. The method may further comprise identifying multiple versions of a video so that it is only indexed one time. The method may further comprise parsing out blocks of script associated with the video, and executing the parsed blocks of script so as to identify one or more location identifiers corresponding to video segments. The method may further comprise grouping differently coded versions of the video together. The method may further comprise searching for video content, wherein a corresponding location identifier of the video may be used to invoke a specific coded video player of a site containing the video.

In another aspect of the present invention, there is a method of video spidering, comprising traversing a network of linked content including at least one video, collecting location identifiers where the video resides on the network, and generating time-based metadata through access to the video via the collected video location identifiers.

In another aspect of the present invention, there is a method of video spidering, comprising spidering a network of linked content so as to locate at least one video, indexing the located video into a video index, and performing maintenance operations on the located video. The maintenance operations may include using date information to either: (1) reindex a previously located video or (2) index a newly posted video. The maintenance operations may include identifying previously indexed video which is missing from the video index. The maintenance operations may include making integrity checks on the located video.

In yet another aspect of the present invention, there is a method of video spidering, comprising dynamically identifying at least one video on a network, accessing content corresponding to the identified video, parsing a script associated with the identified video, and launching the identified video for playback on a visual display according to the parsed script.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate various embodiments of the invention, and not to limit the scope of the invention.

DETAILED DESCRIPTION OF CERTAIN EMBODIMENTS

Figure 1:
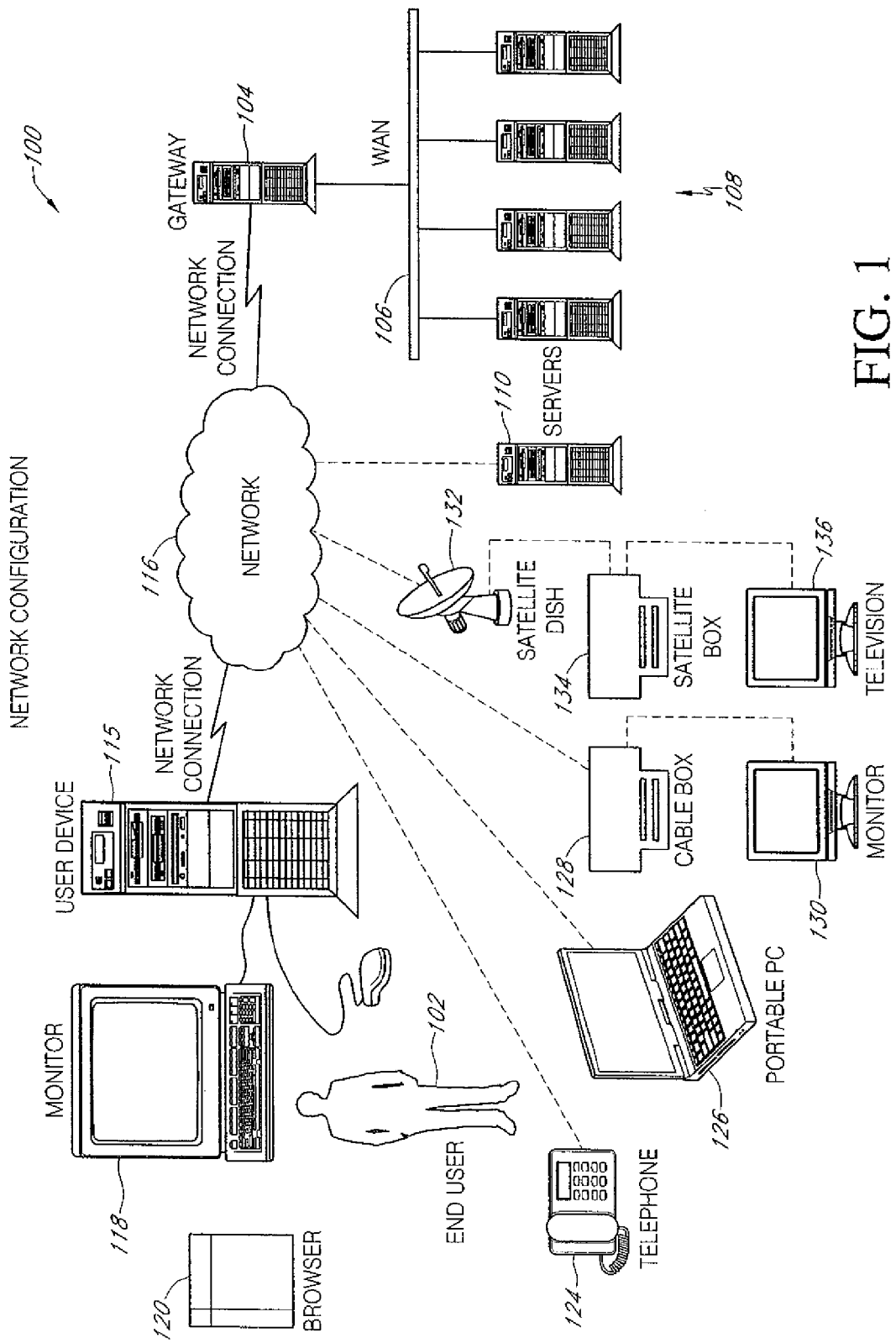
FIG. 1 illustrates a typical network configuration in which this invention may operate.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

DEFINITIONS

The following provides a number of useful possible definitions of terms used in describing certain embodiments of the disclosed invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers, the files and programs being accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

Content, media content, coded (e.g., encoded or transcoded) media content and streaming media content may refer to the delivery of electronic materials such as music, videos, software, books, multimedia presentations, images, and other electronic data, for example over a network to one or more users. Content data will typically be in the form of computer files for video, audio, program, data and other multimedia type content. However, content data may additionally be in the form of actual physical copies of valuable content, for example CD-ROM, DVD, VCR, audio, TV or radio broadcast signals, coded audio and video over networks, or other forms of conveying such information.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, a version of Microsoft Windows, Apple MacOS, IBM OS/2, or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

Content may be provided to the video guide facility for processing via many media sources, including, but not limited to, tape, cable, satellite, or digital files. The content may be encoded or transcoded into various coded video formats, for example, Real, Windows Media, or QuickTime, and indexed. Indexing may be performed using a video logging application, such as the Virage VideoLogger, that analyzes the video signal to extract metadata. Metadata is not the video data itself, but instead is data that is derived by processing performed on the video, audio, or closed caption inputs using advanced media analysis algorithms. Human operators may add additional editorial information through a process known in the art as 'clip marking'. The result is an index of the visual, audio, and textual elements of the video content, synchronized with the corresponding coded video.

Overview of the Internet Video Guide Application

The Internet (although Internet is used in the name, any computing environment or global computer network is part of the invention) video guide (IVG or the "Guide") is a hosted application that is provided as a service to web portals and other websites that wish to expose access to the broad array of video content available on the Internet, either as a whole, or as selected subsets (such as medical content, or science content, etc.). The operation of the Guide is the conjunction of the mechanism for search application hosting and the processes of content gathering. The Guide centralizes video index information available from three main sources:

An aggregated index of video content derived from individual content owners who wish their video to be made available through the Guide. These content owners might be existing service customers of the Virage video application hosting business model ("Guide Affiliates", see Applicant's copending U.S. patent application Ser. No. 09/827,772, filed Apr. 7, 2001, entitled Interactive Video Application Hosting, which is hereby incorporated by reference), or they might be random content owners who submit (and possibly pay a fee to submit) their content to the Guide.

A proactively gathered index of video content collected by the video spidering mechanism to harvest video content from the World Wide Web in general. The spidering mechanism is discussed in detail below, and greatly adds to the efficacy of the Guide since this represents the largest source of video content in the Guide's repository.

A proactively gathered index of video content collected by capturing and indexing public domain content from tape, satellite, cable, or airwaves. These source signals are additionally encoded into coded formats and made available on the Internet by a content distribution network.

These bodies of source content allow the Guide to collect and maintain a video index in the form of a hosted, centralized repository, and provide an application interface that can be made available to web portals and other websites. The central repository consists of a fine-grained, time-stamped video index generated through video logging processes which can also incorporate human editorial annotations and descriptions, and which associates the video index data with the source video via URLs. The Guide's application features rely on a web server and application logic to perform searches against the video index to deliver search results to the web browser of the end user. In one embodiment, searches are conducted using standard text-search technology operating on the video index, such as the engines available from Altavista, Verity, and so on. The presentation of search results employs commonly used template mechanisms to dynamically generate HTML presentations that are distinct from the video index data itself, and can be highly customized for each website that is a customer of the service. Finally, the Guide also provides standard administration and reporting mechanisms that govern the operation, maintenance, and usage statistics of the Guide.

The separation of the video index from the presentation mechanism implies that websites and web portals can integrate the Guide application into their website using a variety of search and retrieval metaphors within their unique user interfaces. A search web page can be built using a search form consisting of one or more fields used to express the query, possibly with options for Boolean operators among the fields. A field could be a simple free-text or keyword entry field, or it could be a pull-down list of pre-defined selections, or it could be a date constraint. Alternatively, a browse web page could be built with category links arranged in a subject hierarchy, with leaf nodes of the hierarchy performing pre-defined searches against the index. A combination of these approaches is also possible, i.e., a fielded search within a selected category. Lastly, a website wishing to only expose a domain-specific subset of the entire video index can utilize a search form that has hidden field constraints built into the query. For example, the search form can constrain the search to only include video in the category "Science", while the end-user enters a free-form keyword search into a standard search field. The use of this technique is a straight-forward application of HTML forms in conjunction with a scripting mechanism such as Javascript.

Overview of the Video Spidering Mechanism

The video spidering mechanism of the Guide is an important innovation that allows the viable realization of the Guide. Just as text-based Internet spiders enabled the existence of traditional web-search services and engines, the video spider enables the existence of the Internet video guide.

The video spidering technology is similar to existing spiders for crawling text-based web pages (i.e., HTML documents), but includes novel new aspects. The spider operates on video content in the form of coded video or files, and uses video logging technology such as disclosed in Applicant's copending U.S. patent application Ser. No. 09/134,497, entitled "Video Cataloger System With Synchronized Encoders", which is hereby incorporated by reference, to generate an index of the video, incorporating both automated processing and the option for manual, editorial processes. The index is committed to the Guide repository along with the URL information of the video being indexed.

The video spider consists of several distinct modules that collectively implement the ability to index Internet video content. The first module is an HTML parsing kernel that can parse web pages and follow hyperlinks by emulating the behavior and capabilities of a standard web browser. This is similar to the traversal mechanisms of traditional, text-based spiders. The second module includes an input queue that can accept starting point URLs to begin traversals. The starting point URLs are typically entered via an administrative process whereby a human editor can direct the spider to prominent, well-known, and high quality content containing video deemed to be of interest to a large user population. The third module includes one or more scripting language parsers and interpreters to identify and execute blocks of embedded script in the pages (such as Javascript, Vbscript, etc.) to evaluate video URLs that are not explicit, simple links to video content. The fourth module includes parsing logic for container files (containing play-lists) such as .ASX (Microsoft) or .RAM (Real Networks) files. The fifth module contains logic for associating and grouping different versions of like content. Often, the same video content is available on a web page in a variety of coded video formats and bit-rates to accommodate the needs and preferences of end-users. The grouping module is responsible for identifying these multiple versions and concluding whether or not they represent the same baseline content. In one embodiment, only one version of the content needs to be harvested and indexed for search and retrieval purposes. During indexing, all versions of the like content are associated with the index. The sixth module includes maintenance logic to minimize the need to re-index content and verify the continued existence and availability of previously indexed content (i.e., "cleaning up dead links"). The seventh module includes a harvesting mechanism that places found and unique video URLs into a queue for processing by the video logging process. Finally, an automated logging mechanism processes the harvest-queue of URLs and ingests the video content using the video logging process to generate a video index associated with each content URL.

Collectively, these modules are organized in a processing system that is governed by a control module to make the spidering, grouping, maintenance, and harvesting system operate. The processes implemented by the above modules generally operate with a significant degree of concurrancy. For example, maintenance and harvesting processes are largely independent and proceed in parallel. The control system manages the operation of these processes, I/O queues, and the submission of the resulting video indices or changes to the indices to the Guide's central repository.

Description of the Figures

FIG. 1 illustrates a typical network configuration 100 in which this invention may operate. However, various other types of electronic devices communicating in a networked environment may also be used. An end user 102 communicates with a computing environment, which may include multiple server computers 108 or a single server computer 110 in a client/server relationship on a network communication medium 116. In a typical client/server environment, each of the server computers 108, 110 may include a server program that communicates with a user device 115, which may be a personal computer (PC), a hand-held electronic device (such as a PDA), a mobile or cellular wireless phone, a TV set, or any number of other electronic devices.

The server computers 108, 110, and the user device 115 may each have any conventional general purpose single- or multi-chip microprocessor, for example a Pentium processor, a Pentium Pro processor, a MIPS processor, a Power PC processor, an ALPHA processor, or other general purpose processors. In addition, the microprocessor may be any conventional special purpose microprocessor such as a digital signal processor or a graphics processor. Additionally, the server computers 108, 110 and the user device 115 may be desktop, server, portable, hand-held, set-top, or other desired type of computing device. Furthermore, the server computers 108, 110 and the user device 115 each may be used in connection with various operating systems, including, for example, UNIX, LINUX, Disk Operating System (DOS), VxWorks, PalmOS, OS/2, Mac OS, a version of Microsoft Windows, or other operating system.

The server computers 108, 110 and the user device 115 may each include a network terminal equipped with a video display, keyboard and pointing device. In one embodiment of the network configuration 100, the user device 115 includes a network browser 120 used to access the server computers 108, 110. The network browser 120 may be, for example, Microsoft Internet Explorer or Netscape Navigator. The user 102 at the user device 115 may utilize the browser 120 to remotely access the server program using a keyboard and/or pointing device and a visual display, such as a monitor 1118. Although FIG. 1 shows only one user device 115, the network configuration 100 may include any number of client devices.

The network 116 may be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means.

In addition, the connectivity to the network 116 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The user device 115 may connect to the network 116 by use of a modem or by use of a network interface card that resides in the user device 115. The server computers 108 may be connected via a wide area network 106 to a network gateway 104, which provides access to the wide area network 106 via a high-speed, dedicated data circuit.

As would be well known to one skilled in the art, devices other than the hardware configurations described above may be used to communicate with the server computers 108, 110. If the server computers 108, 110 are equipped with voice recognition or Dual Tone Multi-Frequency (DTMF) hardware, the user 102 may communicate with the server computers by use of a telephone 124. The telephone may be optionally equipped with a browser 120 and display screen. Other examples of connection devices for communicating with the server computers 108, 110 include a portable personal computer (PC) 126 or a personal digital assistant (PDA) device with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are contemplated by this application.

Additionally, the server computers 108, 110 and the user device 115 may be located in different rooms, buildings or complexes. Moreover, the server computers 108, 110 and the user device 115 could be located in different geographical locations, for example in different cities, states or countries. This geographic flexibility which networked communications allows is additionally within the contemplation of this application.

Figure 2:
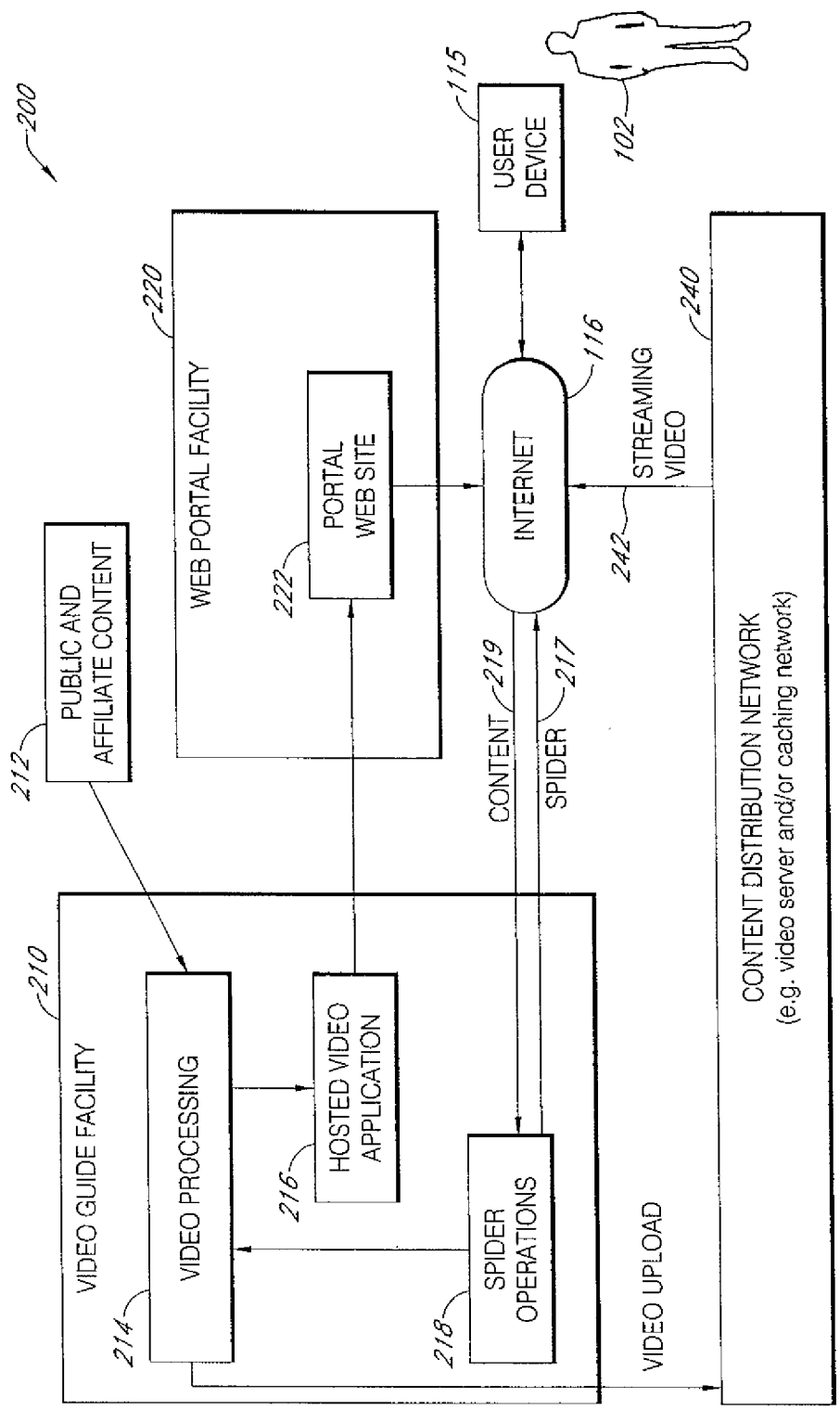
FIG. 2 is a block diagram of a system architecture overview in accordance with one embodiment of the invention.

FIG. 2 is a block diagram of a system architecture 200 overview in accordance with one embodiment of the invention. In this embodiment, the system architecture 200 includes a video guide facility 210, which includes a video processing module 214 for encoding and indexing public and affiliate video content 212. Although the term facility is used, components do not necessarily need to be at a common location. The media content 212 may be transferred from any device connected to the network 116 as shown in FIG. 1, or may be transferred by other means as a live feed or recorded on a physical tape. The video guide facility 210 further includes a hosted video application module 216, which receives index data from the video processing module 214. The hosted video application module 216 communicates with a web portal facility 220 having a portal website 222. The hosted video application module 216 additionally communicates with a content distribution network 240 for uploading coded video. The video guide facility 210 further includes a spider operations module 218 in communication with the video processing module 214.

The portal website 222 communicates with the hosted video application 216 for transferring video search requests and receiving search results data. The system architecture 200 further includes a communications network 116, such as the Internet. The portal website 222 communicates with the content distribution network 240 via the Internet 116. The content distribution network 240 is part of a wide variety of video serving mechanisms and infrastructure that serve to deliver coded media content 242 to the end user 102 via the user device 115. The spider operations module 218 spiders 217 the Internet 116 and receives relevant content 219 from the Internet 116. In one embodiment, the relevant content 219 obtained by the spider operations module 218 from the Internet 116 is sent to the video processing module 214 for logging and indexing. In another embodiment, the spider operations module 218 can include its own logging module to generate a video index, in which case this video index is provided to the hosted video application 216 by the spider operations module 218.

The following paragraphs provide a description of the operation of an embodiment of the system architecture 200 of FIG. 2. A web portal operates a website 222, either hosted internally on a portal web server 350 (FIG. 3) or outsourced to a web-hosting service provider, which delivers their branded interface to end users 102. The spider operations module 218 provides digital content 219 and the public and/or video guide affiliates provide raw media content 212 to the video guide facility 210 for video indexing and encoding by the video processing module 214. Operation of the spider operations module 218 is described hereinbelow. Media content 212 may be provided or delivered as analog video tape in any format, as a broadcast, cable, or satellite feed, or as digitized video in any format delivered via network communications, for example via file transfer protocol ("FTP"). Regardless of its original form, the content 212 is processed by the video processing module 214 to encode the content and extract index data. The index data may include, for example, keyframes, closed-caption text, speaker identifications, facial identifications, or other index data. The content 212 may additionally undergo an editorial process whereby humans label the video by providing, for example, annotations, descriptions, or keywords. The index and annotation information, herein referred to as metadata, is maintained by the hosted video application 216, while the coded video is uploaded to the content distribution network 240.

In one embodiment, content 212 that is originally in analog form is encoded into a digital format in such a way that the time synchronization between the metadata and the encoded video is accurate, as is described in U.S. application Ser. No. 09/134,497, entitled "Video Cataloger System With Synchronized Encoders". Content 212 that is originally in digital form, typically a high-resolution format, is transcoded into an appropriate format for transmitting. Typically, video content 212 is coded in multiple formats (for example RealVideo, Microsoft Windows Media, QuickTime, or MPEG) and bit rates (for example modem speed or broadband speed) to offer end users 102 a choice of presentation, often depending on individual preferences or Internet connection bandwidth. The resulting digital video files from either encoding or transcoding are uploaded to the content distribution network 240, which delivers the actual coded video for display to the end user 102. Once the end user 102 selects an actual segment of video content 224 to view, the appropriate video is transmitted from the content distribution network 240 to the end user's browser for display via the Internet 116. Operation of the spider operations module will be described hereinbelow.

Figure 3:
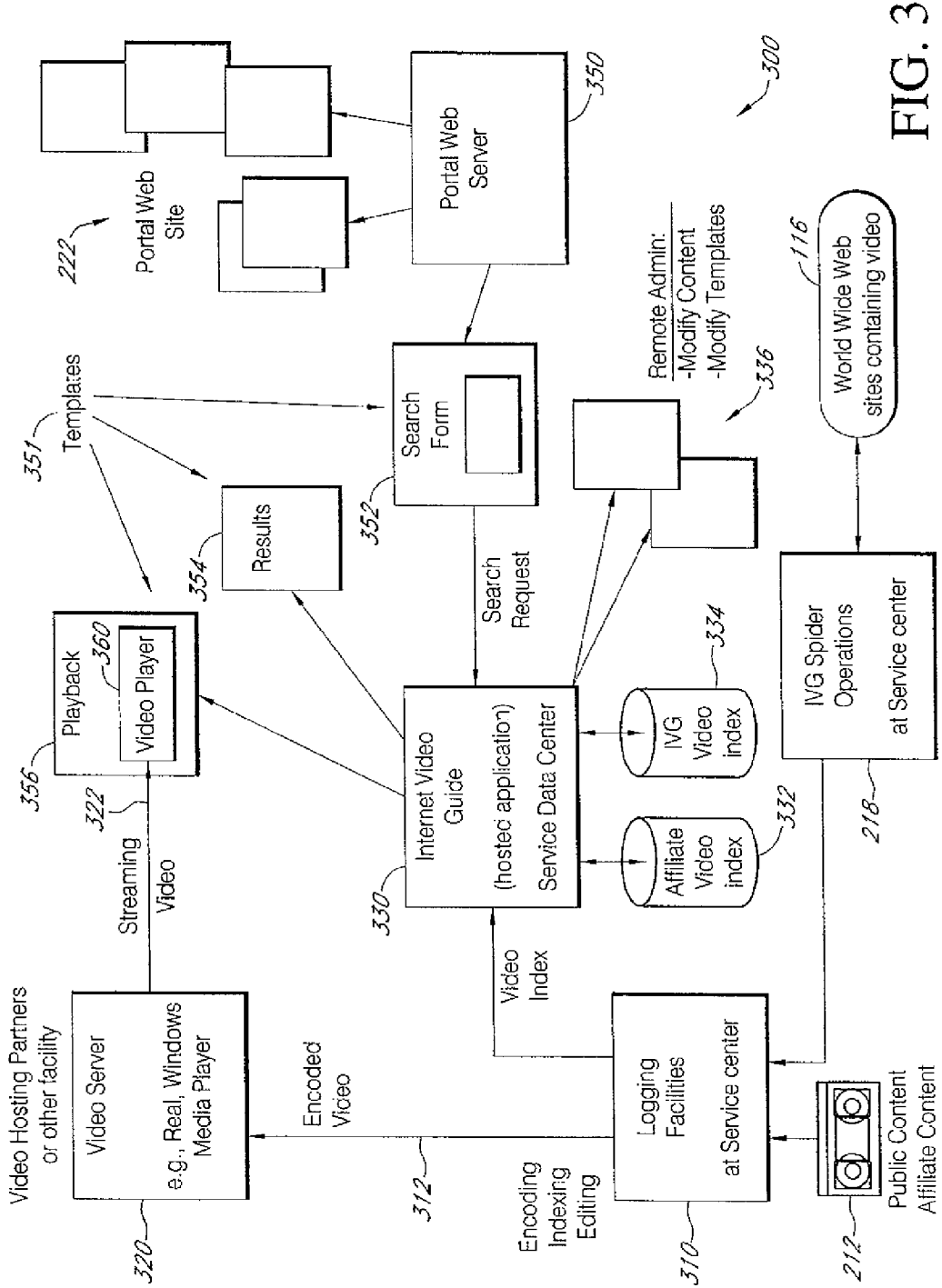
FIG. 3 is a block diagram showing a high-level view of a set of components of the video guide embodiment and a typical structure of a web portal that is a consumer of this service in accordance with another embodiment of the invention.

FIG. 3 is a block diagram of an architecture 300 of the components of the spider operations and IVG in accordance with another embodiment of the system. The embodiment of FIG. 3 is similar to that in FIG. 2, but is depicted in greater detail. The architecture 300 shows a high-level view of the IVG, it's major components, and a typical structure of a web portal that is a consumer of this service. A main video index, which includes an IVG video index 334 and an Affiliate video index 332, with time-stamped metadata and video URL references is managed by a central Guide server (not shown) which hosts an IVG search application 330 on behalf of a portal website 222 (on the portal web server 350). In one embodiment, the IVG video index 334 and the Affiliate video index 332 can be combined in a single database management system (dbms) index.

Video content is logged and indexed at logging facilities 310 at a service center that receives input from two main sources: content identified and processed by the video spider operations module 218, and Affiliate and Public content 212 usually (but not exclusively) from tape sources. The logging facilities 310 may also include optional human editing to add annotations to the video index. The video spider operations module 218, the IVG application 330 and the logging facilities 310 may all be co-located at a single service center, or may be located at separate centers. Content found by the spider already exists on the World Wide Web on the Internet 116. This means the actual video bits of the content are already available for transmitting (i.e., is coded) and the video index points to the location of the video bits via a video URL. Affiliate and Public content 212 which is processed by the logging facilities 310 is additionally encoded and uploaded 312 to a video server 320 or the content distribution network 240 (FIG. 2) to be made available on the Web as coded video. The content distribution network 240 can include a caching network such as available from Akamai, Digital Island, Real Broadcast Network, etc.

The portal website 222 (the customer of the IVG service) uses the dynamic HTML publishing capabilities underlying the server hosting the Guide to present a search interface or form 352, a results interface 354, and a video playback interface 356 to their end users. The video playback interface 356 typically is part of a Web browser and includes a video player 360. A set of templates 351, such as described in Applicant's copending U.S. patent application Ser. No. 09/827,772, filed Apr. 7, 2001, entitled Interactive Video Application Hosting, enables HTML rendering of the search forms 352, results data 354 presentation, and video playback 356. Such templates 351 dictate the graphical look-and-feel of the media presentation to a user of the system. A set of Guide administration functions 336 enable the web portal customer to maintain and modify their template interface to the Guide. The administration functions 336 also allow the Guide's own administrators to manage the index and spidering operations.

Figure 4:
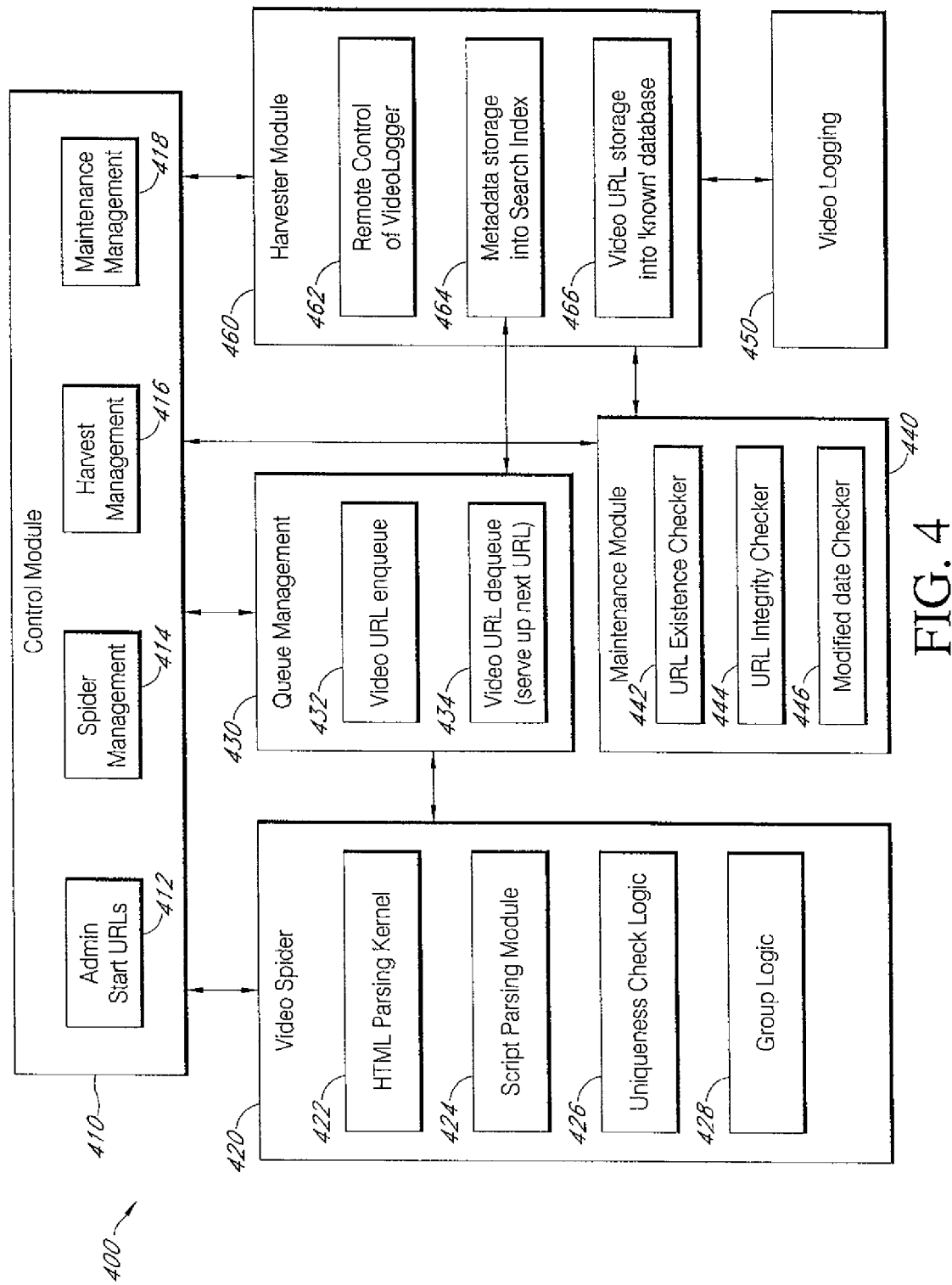
FIG. 4 is a block diagram showing the major modules of the video spidering subsystem shown in FIG. 2 and FIG. 3.

FIG. 4 is a block diagram showing an architecture 400 of the major modules of the video spidering system 218 previously shown in FIGS. 2 and 3. Each of these modules represents an independent computer process that typically executes with a large degree of concurrency. In one embodiment, the master control of all spidering, harvesting, and maintenance operations is the Control module 410. This module 410 exposes administrative interfaces 412 for scheduling processing and providing the starting 'seed' URLs for the spider to begin traversal. Starting point URLs are managed in a queue and passed as jobs to a Video Spider module 420. Control module 410 also allows the administrator to balance processing time between a gathering (spidering) process on module 420, via a spider management interface 414, a harvesting process on a Harvester module 460, via a harvest management interface 416, and a Maintenance module 440 for regular, scheduled maintenance operations via a maintenance management interface 418. The Control module 410 also interfaces with a Queue Management module 430 that communicates with the Video Spider module 420 and the Harvester module 460.

The Video Spider module 420 further includes an HTML parsing kernel 422, a script parsing module 424, a uniqueness check logic 426 and a grouping logic 428, which will be further described in conjunction with FIG. 6 below. The Video Spider module 420 communicates with the Queue Management module 430 for storage of data. The Queue Management module 430 includes a video URL enqueue function 432 and a video URL dequeue function 434 as will be described below.

The Queue Management module 430 further communicates with and provides data to the Harvester module 460. The Harvester module 460 includes a remote control of video logging function 462, a metadata storage into search index function 464 and a video URL storage into 'known URL' database function 466 as will be described below. The Harvester module 460 further communicates with a video logging module 450, such as the Virage VideoLogger which may be located at the logging facilities 310 (FIG. 3), and with the Maintenance module 440. The Maintenance module 440 includes a URL existence checker 442, a URL integrity checker 444, and a modified date checker 446 as will be described below.

Figure 5:
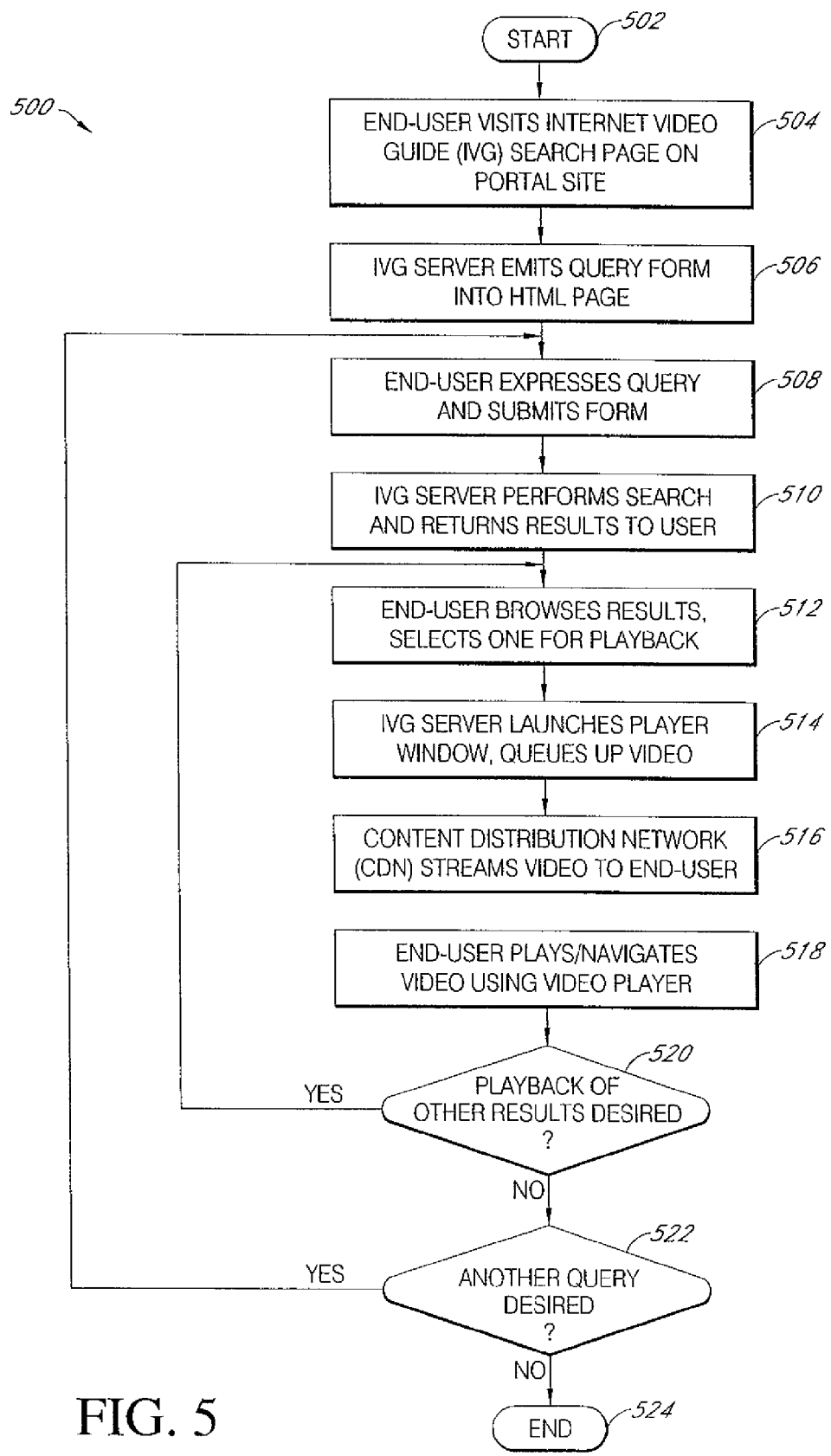
FIG. 5 is a flowchart showing the process of end-user search, browse, and retrieval of selected video content found in the guide's repository as performed on the architecture embodiments shown in FIGS. 2 and 3.

FIG. 5 is a flowchart showing a process 500 of end-user search, browse, and retrieval of selected video content found using the Guide's repository of video metadata (in the affiliate video index 332 and the IVG video index 334) and the Guide application server. The end-user process 500 of interacting with the Guide 330 (through the user's favorite web portal, such as portal website 222) will be described along with the end-user value of the underlying innovations in the Guide.

The process 500 begins at start state 502 and moves to state 504 where the end-user 102 (FIG. 1) visits a search page found on the web portal 222 (customer of the Guide). The search page 352 is dynamically composed of text, graphic, and navigation elements from the web portal's own web server, such portal web server 350 (FIG. 3), and a search form emitted by the Guide server at state 506. Alternatively, a category browser page, or a combination page including a category browser and a search form may be utilized. Proceeding to state 508, the end-user 102 then expresses a query or search request in the search form, such as by entering keywords, making pull-down selections, and so forth, and submits the query.

Advancing to state 510, the Guide server then performs the query against the video index, and returns results. The query results are dynamically formatted into the template-based (351) results presentation screen 354 used by the web portal 222. From the results presentation screen 354, the end user 102 can browse the video results by inspecting any/all of the keyframes, titles, descriptions, a transcript, and other available metadata for the found asset at state 512. The exact presentation is governed by the templates (351) used by the web portal 222. Moving to state 514, once the user 102 selects a specific video for playback, the Guide launches a video player window, such as an HTML playback window 356, and invokes the coded video identified by the video reference URL. This typically accesses the desired coded video residing on the content distribution network 240 (FIG. 2) or the video server 320 at state 516. The video player window includes an embedded video player, which may be a module such as the Real or Windows or QuickTime player, placed within the window 356. The window 356 may have navigation, advertising, and so forth presented in the context of the customer site (portal), while the video player 360 is the technology component for decoding the coded video and displaying it. The user is then free to employ the standard video playback controls found in player windows (play, pause, stop, fast forward, rewind, etc.) at state 518 to navigate and view the decoded video.

When the user has completed navigating and viewing the video at state 518, process 500 advances to a decision state 520 to determine if the user desires to select other query results for playback. If so, process 500 moves back to state 512 where the user selects another one of the query results. However, if the user does not desire to select other query results for playback as determined at decision state 520, process 500 continues at a decision state 522 to determine if the user desires to express another query. If so, process 500 moves back to state 508 to enter and submit a different query. However, if the user does not desire to express another query as determined at decision state 522, process 500 completes at end state 524.

Figure 6A:
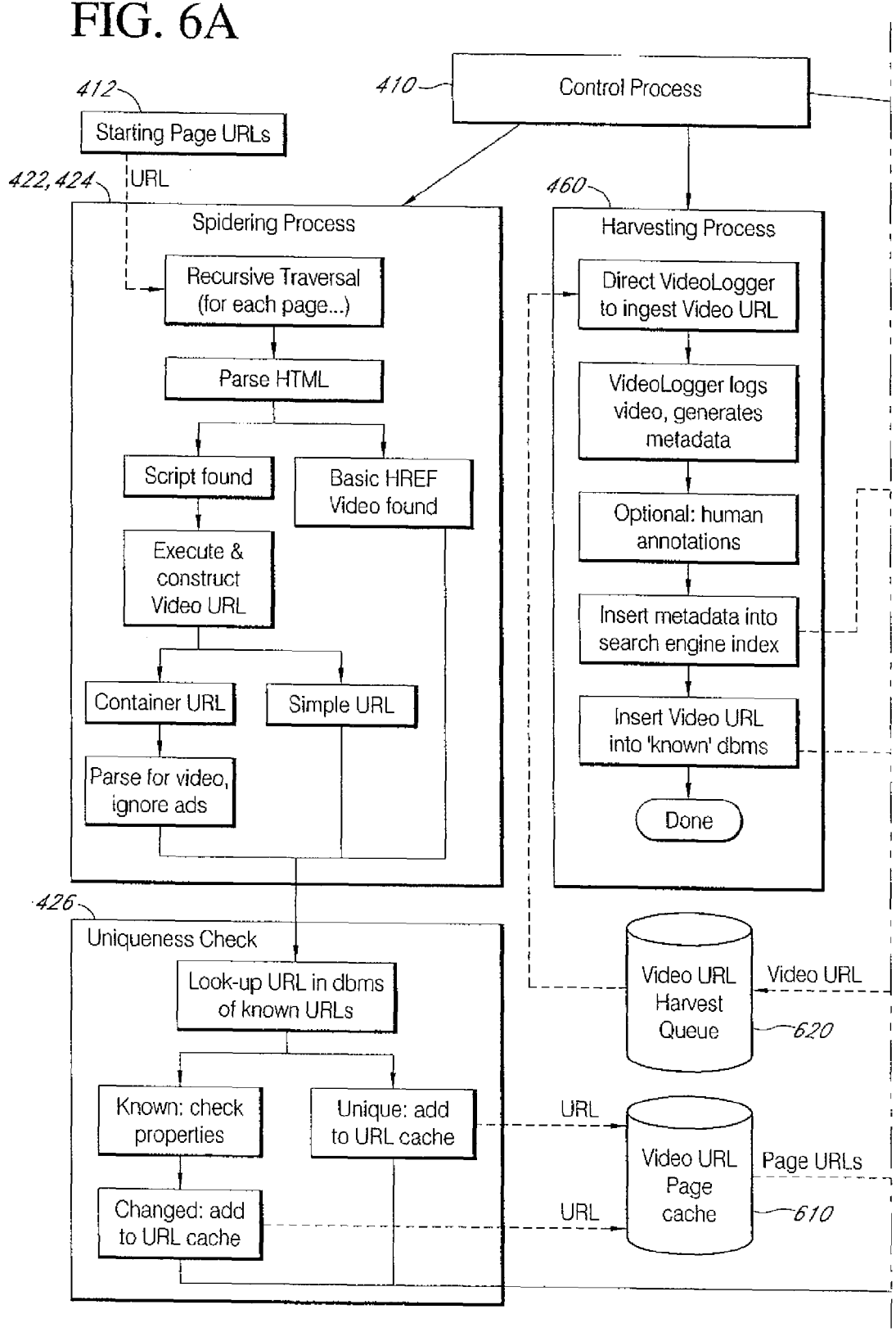
FIG. 6 is a flowchart showing the overall process of video spidering and video index maintenance as performed on the architecture embodiments shown in FIGS. 2 and 3.
Figure 6B:
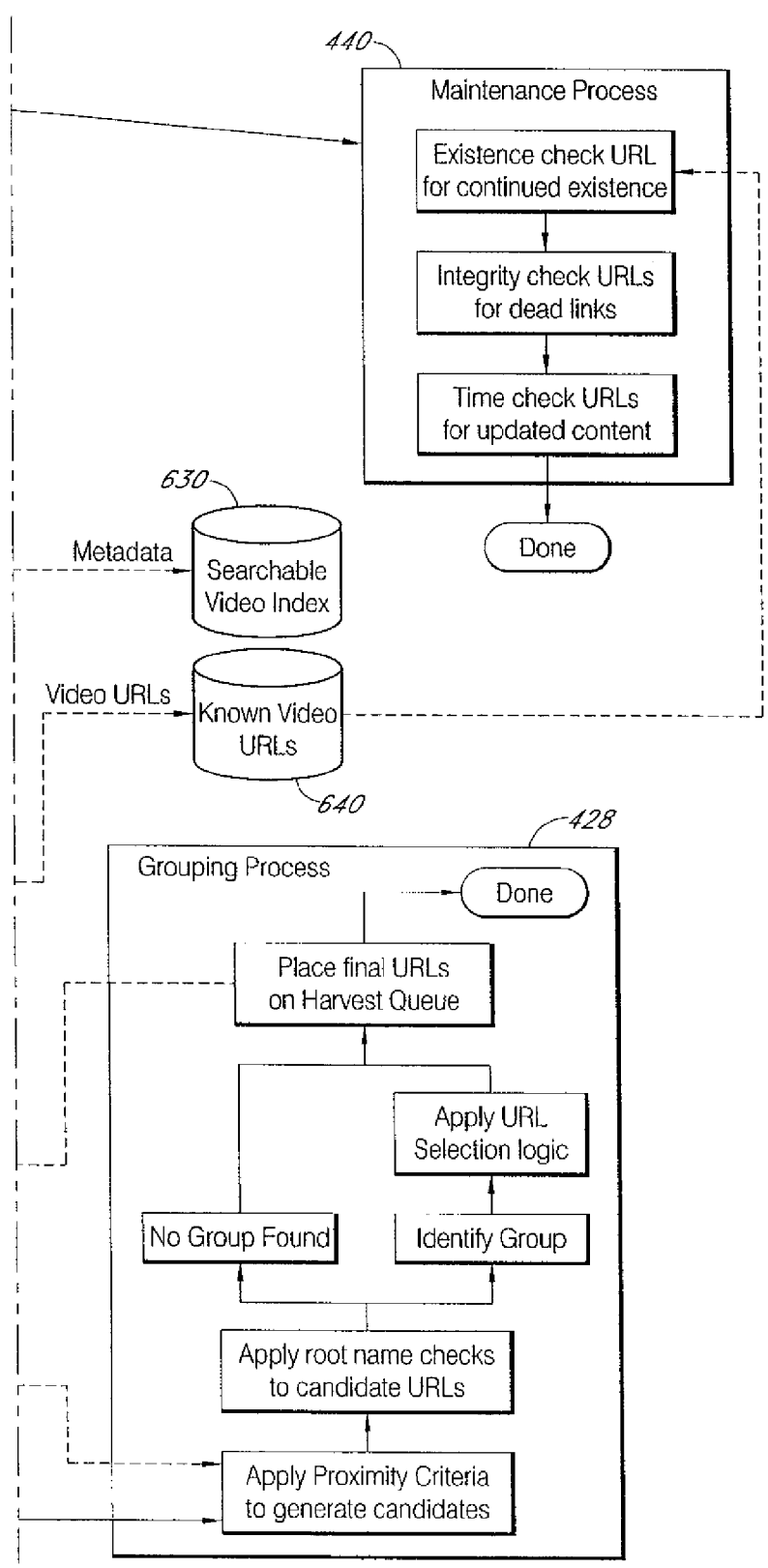
Figure 6:
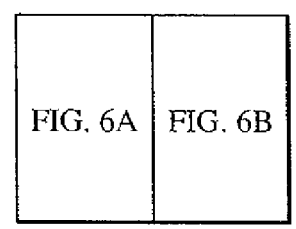

FIG. 6 is a flowchart showing the overall process 600 of video spidering and video index maintenance, and gives an overview of the collection of subprocesses corresponding to the modules previously shown in FIG. 4 (these subprocesses will be identified with the reference number of a corresponding module). Many of these processes operate concurrently. A detailed description of each subprocess is provided in conjunction with FIGS. 7 through 11. A Control process corresponding to the Control module 410 (FIG. 4) manages sets of subprocesses and uses standard techniques for monitoring and balancing compute resources for these subprocesses. One set of subprocesses is Spidering 422/424, Uniqueness Checking 426, and Grouping 428 which collectively identify video URLs for harvesting. The Spidering process 422/426 traverses web pages and gathers candidate URLs that are passed to the Uniqueness Check 426 to avoid re-indexing URLs that are already known. Unique URLs are then passed to the Grouping process 428 through a video URL page cache 610 to identify like content that exists in various bit rates and formats.

The Grouping process 428 results in final URLs placed in a video URL harvest queue 620. The Control process 410 also maintains the Harvesting process 460 for actually processing and indexing the video identified by the final URLs. In one embodiment, the resulting metadata is stored in a searchable video index 630 and the video URLs are stored in a known video URLs database 640. In one embodiment, the searchable video index 630 corresponds to the IVG video index 334 (FIG. 3). The Control process 410 also operates the periodic (such as, running once every day or week) Maintenance process 440 to check link existence, integrity, and potential modifications (new content found at a previously known URL).

Figure 7:
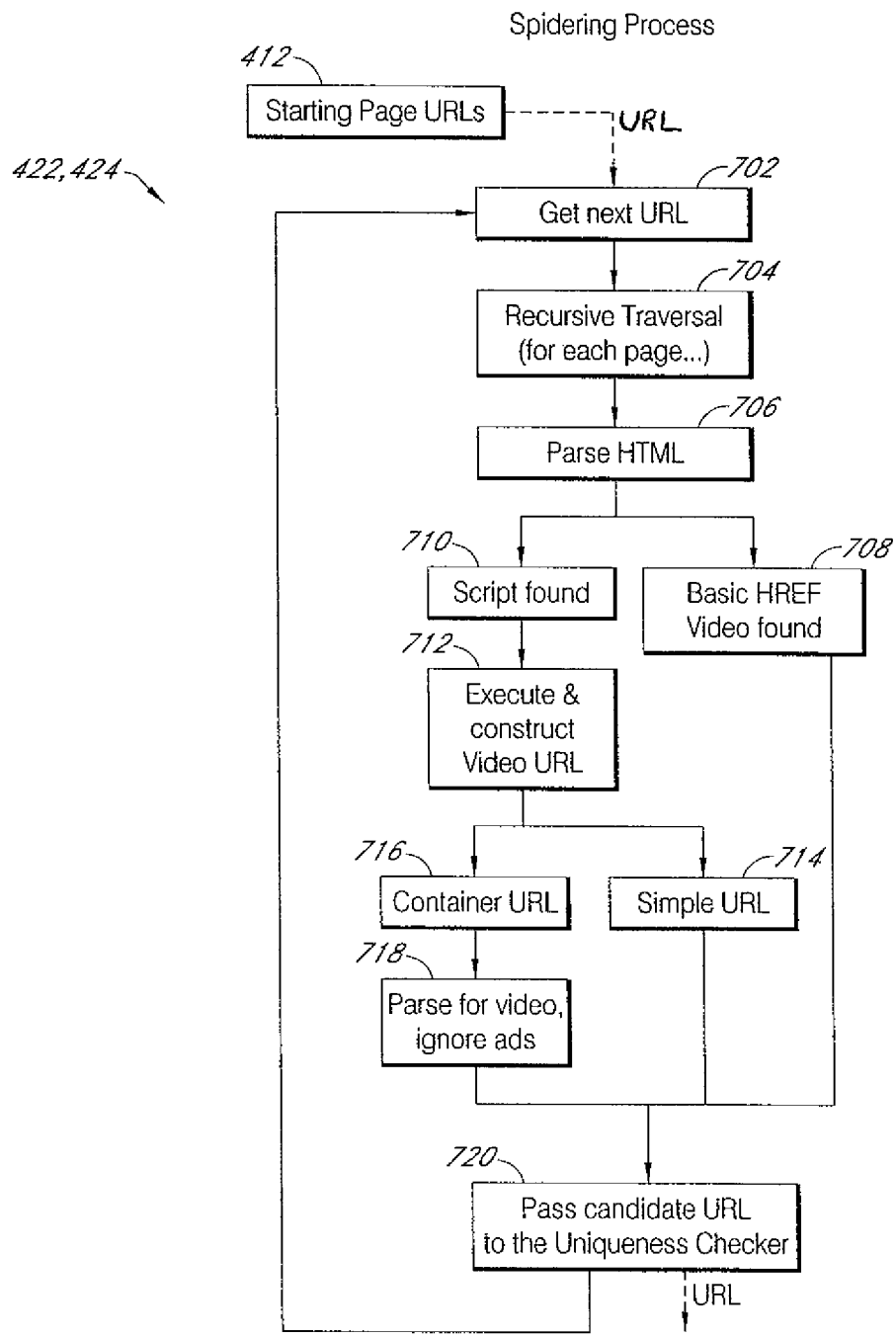
FIG. 7 is a flowchart detailing the spidering process shown in FIG. 6.
Figure 8:
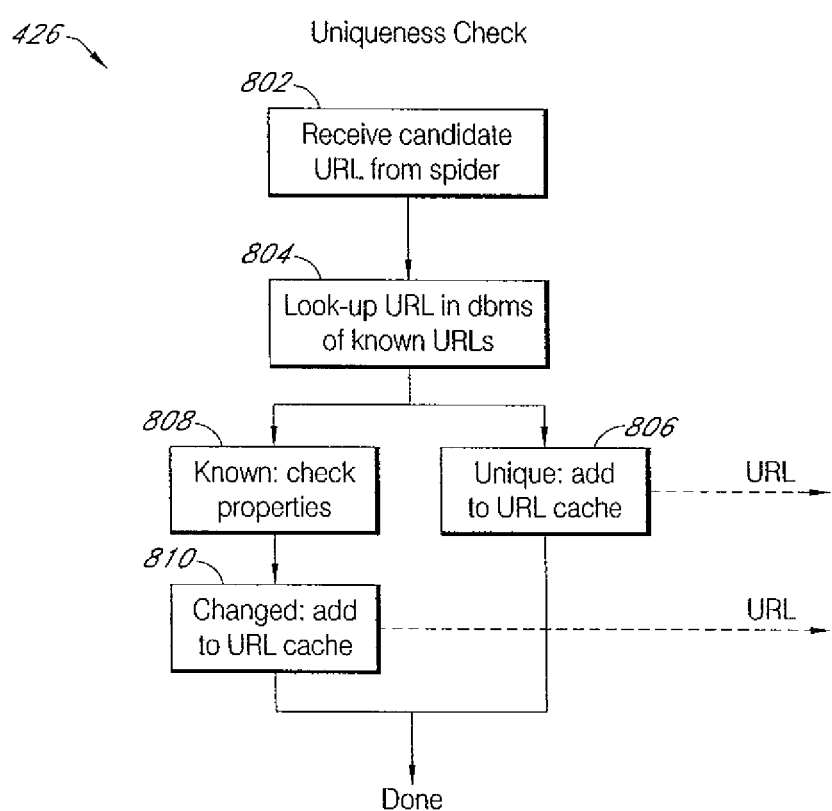
FIG. 8 is a flowchart detailing the uniqueness check process shown in FIG. 6.

Referring to FIG. 7 and also to FIG. 6, the main video spidering process 422/424, previously shown in FIG. 6, will now be described. The spidering process 422/424 begins at state 702 with the starting point URLs being provided by an input queue mechanism (coming from the administrative interface 412 (FIG. 4) of the Control process 410 in one embodiment). For each starting point URL, the spider process 422/424 visits the page and parses the HTML to recursively traverses links on that site at state 704. At each leaf of the recursion tree, the process 422/424 parses the HTML to identify video content at state 706. Process 422/424 may find basic (HREF) video URLs based on the MIME-type of the link found at state 708. These are the simple forms of video that can be found and directly processed further, i.e., process 422/424 proceeds to pass the candidate URL to the Uniqueness Check process 426 described in conjunction with FIG. 8. Or else, process 422/424 may find scripting blocks at state 710. The scripting blocks are parsed and executed at state 712 in order to evaluate the deeper mechanism for access to the video content. In widespread practice today are two possible forms: scripts that evaluate to a simple video URL at state 714 (in which case the system proceeds to pass the candidate URL to the Uniqueness Check process 426), or "container" URLs at state 716. Container URLs can accomplish many things, such as assembling a play list of video segments that are presented to the user. Clip segments might be 'bumpers' (i.e., logos, intros, etc.), or advertising. Advertising, in particular, should not be indexed as part of the process, and can be easily identified in practice because of its origin (e.g., such as from an ad broker like DoubleClick or Engage). Therefore, if a container URL is found at state 716, it is parsed at state 718 to identify the actual content segment(s) that need to be indexed. Once such an URL is parsed out of the container play list, process 422/424 proceeds to state 720 to pass the candidate URL to the Uniqueness Check process 426 (FIG. 8). Concurrently, in one embodiment, the spidering process 422/424 moves back to state 702 to get the next URL as described above.

Referring to FIG. 8 and also to FIG. 6, the video content uniqueness checking process 426, previously shown in FIG. 6, will now be described. The process 426 begins at state 802 by accepting a candidate video URL from the spidering process 422/424 (FIG. 7). Moving to state 804, process 426 performs a database look-up of the candidate URL against the repository of known URLs in database 640. If the URL is found to be unique at state 806, it is passed into the URL page cache 610 to be processed by the Grouping process 428. Else, at state 808, if the URL is determined to be already known, the content is checked for any updates or changes since the last time it was indexed. The process 426 checks the date, byte count, and duration (or any combination of those criteria or other designated criteria) of the video to see if any of these properties have changed. If so, the URL requires re-indexing and process 426 advances to state 810 where the URL is passed to the URL page cache 610 for further processing. At the completion of state 806 or state 810, process 426 ends and transfers execution to the grouping process 428 (FIG. 9).

Figure 9:
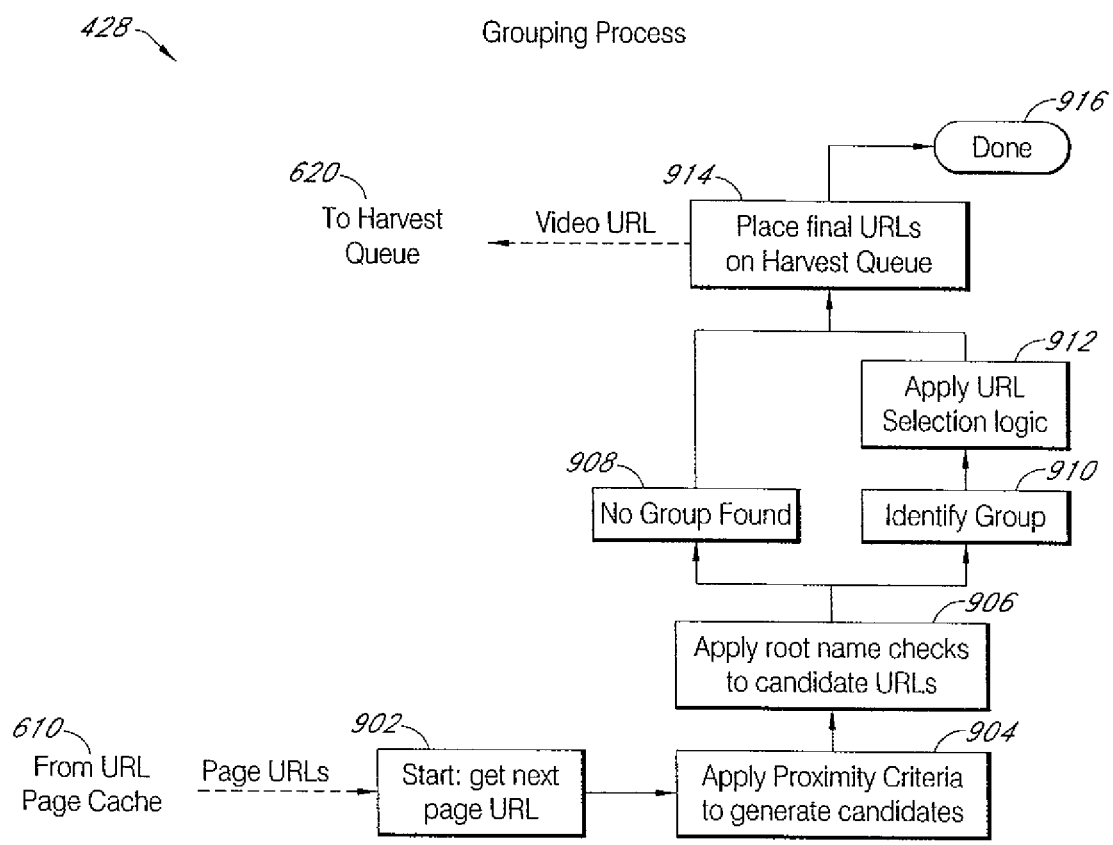
FIG. 9 is a flowchart detailing the video grouping process shown in FIG. 6.

Referring to FIG. 9 and also to FIG. 6, the video grouping process 428, previously shown in FIG. 6, will now be described. The process 428 begins at state 902 by retrieving a next video URL from the page cache 610. Advancing to state 904, process 428 applies a set of proximity criteria to generate candidates for grouping. URLs are considered proximate if they are physically close together within the HTML or scripting blocks. Those candidates identified at state 904 are then passed to a root name checking state 906 that looks for common strings in the root of the URL. Most often, like content that differs only in format or bitrate will have the same basic identifier, with only the final filename or suffix indicating a difference. For example, a video on a Real Server might be referenced as "rtsp://server_name/content/news.rm" while the same video in Microsoft format would be "rtsp://server_name/content/news.asf". As another example, bit rate differences are typically indicated with suffix changes to the filename, such as "news_56k.rm" and "news_300k.rm" representing two different bit rates of Real Video (56 kbps and 300 kbps, respectively). Common URL root names and differing suffixes are fairly easy to parse and identify using string comparisons. If, at state 908, no grouping is found, the individual page URLs are passed at state 914 to the final harvest queue 620 for processing by the harvest process 460 described in conjunction with FIG. 10. If, at state 910, a group of like URLs is found, the process 428 proceeds to a selection criteria state 912 to select the one, best URL for indexing purposes. The selection criteria is designed to balance the requirements of having high quality video signals (not degraded by too much compression), and the bandwidth and computational costs of processing and indexing video. These criteria can easily change over time with changes in the cost structures for bandwidth and computation, and with changes in available video formats (e.g., some formats might be preferable over others at a given bit rate). An example criteria in use today is selecting the highest bit rate, and to prefer Real Video over other formats. Once the selection is made at state 912, the final URL is placed in the Harvest Queue 620 at state 914. At the completion of state 914, process 428 ends at a done state 916. In one embodiment, process 428 is a portion of the spidering process 420, which is load-balanced, and thus, processes 422, 424, 426, and 428 occur sequentially. In another embodiment some or all of processes 422, 424, 426, and 428 can be separated into independent load-balanced processes with corresponding enqueue/dequeue mechanisms.

Figure 10:
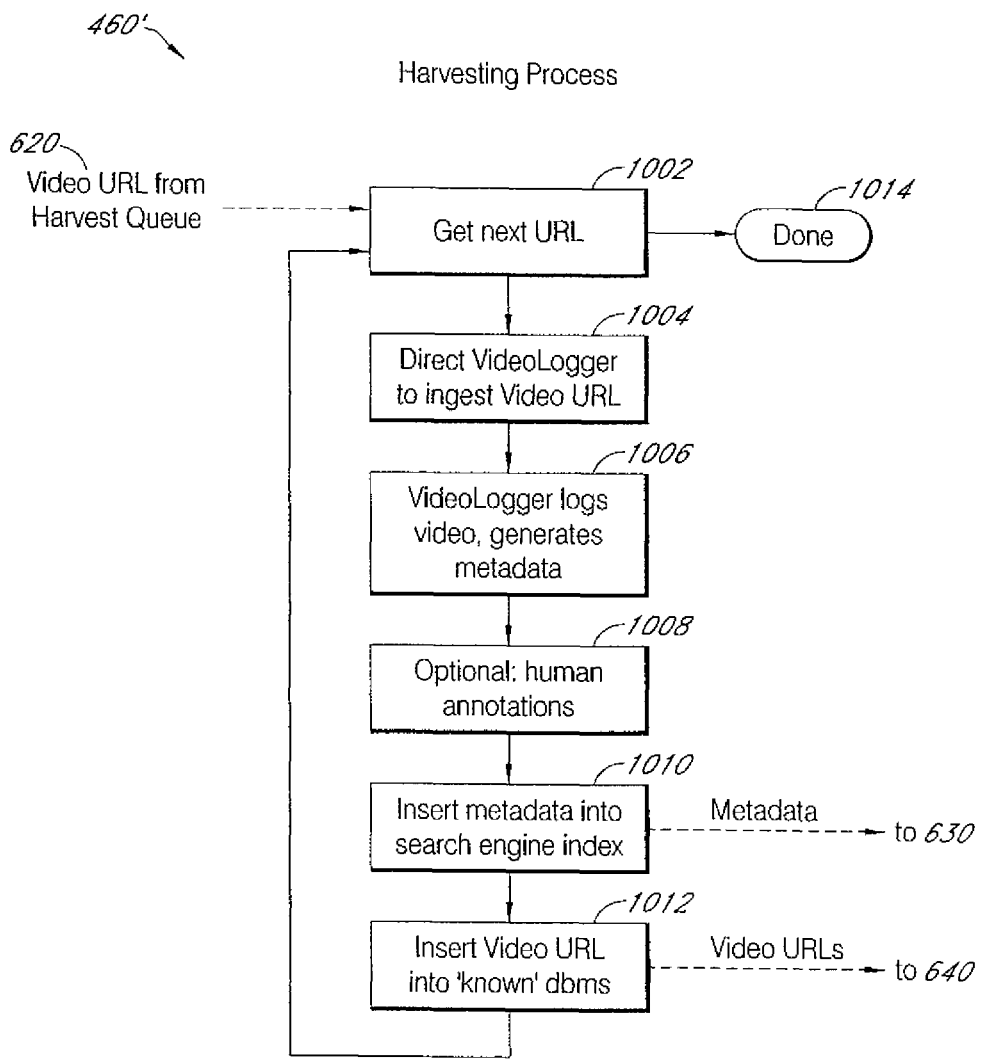
FIG. 10 is a flowchart detailing the video harvesting process shown in FIG. 6.

Referring to FIG. 10 and also to FIG. 6, the video logging process 450 and video harvesting process 460, previously shown in FIG. 6, will now be described collectively as process 460'. The process 460' begins at state 1002 by retrieving the next video URL from the harvest queue 620. The harvest process 460' has at least one, and typically several, video logging resources 450 under its control. The video URL is submitted to the next available video logging resource 450 at state 1004 to ingest the video and generate a metadata index of the content. Proceeding to state 1006, the video logging resource 450 logs the video and generates a batch of time-stamped metadata. Continuing at state 1008, an optional human process can occur whereby the human provides additional annotations, category selections, or create titles for the content. Proceeding to state 1010, process 460' inserts the resulting video index (metadata) into the production video index 630 in the Guide's application server and is then available for search and retrieval operations. Advancing to state 1012, the corresponding "known" video URL is also inserted into the optimized database of known video URLs 640 which is used by the Uniqueness Checking process 426. Process 460' repeats as long as there are additional harvest URLs provided by the enqueue/dequeue management mechanism 430. At the completion of state 1012 and if there are no further harvest URLs to process, process 460' ends at a done state 1014.

Figure 11:
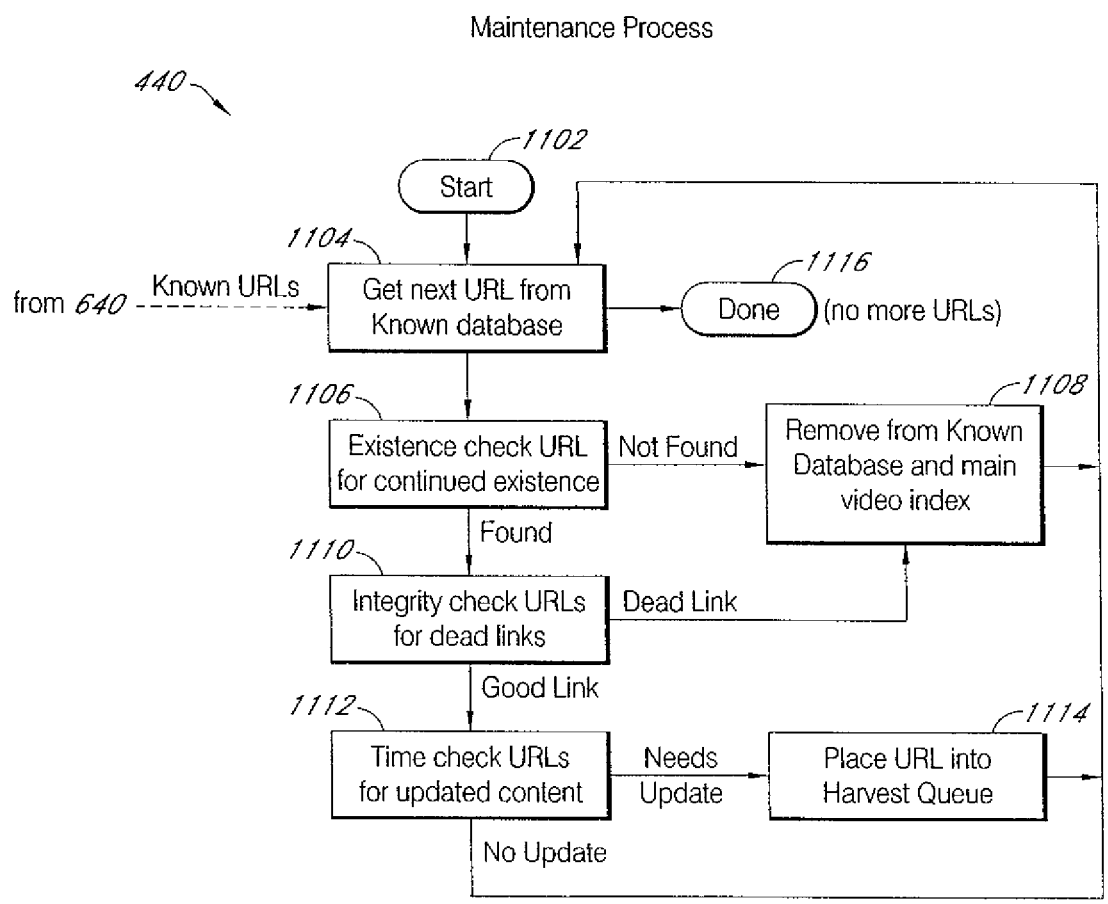
FIG. 11 is a flowchart detailing the video index maintenance process shown in FIG. 6.

Referring to FIG. 11 and also to FIG. 6, the video index maintenance process 440, previously shown in FIG. 6, will now be described. The process 440 typically runs periodically under the control of the Control Process 410. When the maintenance process 440 is invoked at start state 1102, it starts processing URLs from the known video URL database 640 at state 1104. For each URL, process 440 advances to state 1106 and performs an existence check to see if the URL is still present on the page it was originally found. If the URL is not found at state 1106, process 440 moves to state 1108 and removes the URL from the known video URLs database 640 and the video index 630 of the Guide's server is updated to remove the URL. If the URL is found at state 1106, this implies the video is still 'published' on the page, and the process 440 proceeds to an integrity check at state 1110. The integrity check actually follows the link to verify that the video can be accessed and that the link is not a 'dead link' (resulting in an HTTP error 404: "Link not found" message, for example). If the link is deemed a dead link by state 1110, it is removed from the system at state 1108 as above. If the link is still valid as determined at state 1110, the process 440 proceeds to a modification check at state 1112 to see if the content has been updated or changed since it was last indexed. The modification check is similar to the properties check 808 that occurs during the Uniqueness Check process 426 (FIG. 8). Process 440 checks the date, byte count, and duration (or any combination of those criteria or other designated criteria) of the video to see if any of these properties have changed. If so, the URL requires re-indexing and process 440 advances to state 1114 where the URL is passed to the video harvest queue 620 for harvesting. If the URL does not require re-indexing as determined at state 1112, the process 440 loops back to state 1104 to begin work on the next URL from the known video URLs database 640. If there are no further URLs in the known video URLs database 640, process 440 ends at a done state 1116.

As described herein, embodiments of the invention fill the longstanding need in the technology for a system whereby a website or web portal can access centralized video index information derived by a logging process from random content owners, Guide affiliates, proactively gathered public domain content, and proactively harvested video content from a network (e.g., the Internet) via a video spidering mechanism. The video index information can be collected and maintained in a hosted, centralized repository and made available via an application interface, which can be customized, to users of the network.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes which come within the meaning and range of equivalency of the claims are to be embraced within their scope.

What is claimed is:

1. A method of video spidering, comprising:
   traversing a set of uniform resource locators (URLs);
   dynamically identifying a script containing a URL indicative of at least one video on a packet switched network, wherein the script comprises a software program;
   parsing the identified script;
   executing the parsed script to evaluate uniform resource locators, wherein the uniform resource locators include links to video content;
   identifying video content referred to by the script;
   generating a location identifier of the video content referred to by the script; and
   storing the location identifier associated with the identified video content.

2. The method defined in claim 1, wherein the location identifier is a video uniform resource locator (URL).

3. The method defined in claim 1, additionally comprising launching the identified video content for playback on a visual display according to the location identifier.

4. The method defined in claim 3, wherein launching the identified content comprises invoking a specific coded video player of a site containing the identified video based on the location identifier.

5. The method defined in claim 1, wherein the executed script evaluates to the location identifier of the video content.

6. The method of claim 1, wherein the uniform resource locators include non-explicit links to video content.

7. The method of claim 1, wherein a container file comprises video content.

8. The method of claim 1, wherein the uniform resource locators are embedded in a container file.

9. A method of video spidering, comprising:
   traversing a set of uniform resource locators (URLs);
   dynamically identifying a script containing a URL indicative of at least one video on a network;
   parsing the identified script;
   executing the parsed script;
   identifying a container file referred to by the script, wherein the container file includes two or more location identifiers, each location identifier corresponding to a different video, and wherein an identity of the container file is included as part of the script;
   parsing the identified container file;
   evaluating the parsed container file to identify a location identifier of video content; and
   storing the location identifier associated with the video content.

10. The method defined in claim 9, wherein evaluating the parsed container file comprises excluding advertising content.

11. The method defined in claim 9, additionally comprising launching the identified video content for playback on a visual display according to the location identifier.

12. The method defined in claim 11, wherein launching the content comprises invoking a specific coded video player of a site containing the identified video based on the location identifier.

13. The method defined in claim 9, wherein the script is programmed in Java script or Visual Basic script.

14. The method defined in claim 9, wherein the location identifier is a video uniform resource locator (URL).

15. A method of video spidering, comprising:
   traversing a set of uniform resource locators (URLs);
   dynamically identifying a script containing a URL indicative of at least one video on a network;
   parsing the identified script;
   executing the parsed script;
   identifying a container file referred to by the script, wherein the container file includes two or more location identifiers associated with individual videos;
   parsing the identified container file;
   evaluating the parsed container file to identify a location identifier of video content; and
   storing the location identifier associated with the video content.

* * * * *